(12) United States Patent
Takimoto et al.

(10) Patent No.: US 7,055,858 B2
(45) Date of Patent: Jun. 6, 2006

(54) AIRBAG DEVICE

(75) Inventors: Masahiro Takimoto, Aichi-ken (JP); Atsushi Nagata, Aichi-ken (JP); Yoshio Mizuno, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 161 days.

(21) Appl. No.: 10/395,354

(22) Filed: Mar. 25, 2003

(65) Prior Publication Data

US 2003/0184069 A1 Oct. 2, 2003

(30) Foreign Application Priority Data

| Apr. 1, 2002 | (JP) | ............................. 2002-098603 |
| Apr. 1, 2002 | (JP) | ............................. 2002-098613 |

(51) Int. Cl.
 *B60R 21/16* (2006.01)
(52) U.S. Cl. ................................. 280/743.1; 280/743.2
(58) Field of Classification Search ............. 280/743.1, 280/743.2, 729
See application file for complete search history.

(56) References Cited

U.S. PATENT DOCUMENTS

| 4,842,300 A | 6/1989 | Ziomek et al. |
| 5,678,858 A | 10/1997 | Nakayama et al. |

FOREIGN PATENT DOCUMENTS

| DE | 4240227 A1 | 11/1991 |
| DE | 4420799 A1 | 6/1993 |
| DE | 29807424 U1 | 10/1998 |
| DE | 19900592 A1 | 7/2000 |
| EP | 0684167 A1 | 11/1995 |
| EP | 0734912 A2 | 10/1996 |
| EP | 0818360 A1 | 1/1998 |
| EP | 1 044 854 A2 | 10/2000 |
| GB | 2263671 A1 | 8/1993 |
| JP | U-63-112952 | 7/1988 |
| JP | A-4-201755 | 7/1992 |
| JP | A-5-208646 | 8/1993 |
| JP | A-5-221277 | 9/1993 |
| JP | U-5-71063 | 9/1993 |
| JP | A-6-127321 | 5/1994 |
| JP | A-8-301054 | 11/1996 |
| JP | A-9-123863 | 5/1997 |
| JP | A-10-59103 | 3/1998 |
| JP | A-10-71911 | 3/1998 |

(Continued)

OTHER PUBLICATIONS

U.S. Appl. No. 10/137,468, filed May 3, 2002, Takimoto et al.
U.S. Appl. No. 10/141,057, filed May 9, 2002, Takimoto et al.

(Continued)

*Primary Examiner*—Eric Culbreth
(74) *Attorney, Agent, or Firm*—Posz Law Group, PLC

(57) ABSTRACT

An airbag device comprising: an airbag adapted to be expanded and inflated by admitting an inflating gas; and an inflator housed in the airbag for feeding the inflating gas to the inside of the airbag. The airbag includes an airbag body forming a bag-shaped outer peripheral wall, and a reinforcing cloth for preventing a gas leakage from the airbag body. The reinforcing cloth is joined at its peripheral edge on the upstream side of the inflating gas to the outer peripheral wall in the airbag body but is not joined at the edge portion of the reinforcing cloth on the downstream side of the inflating gas.

11 Claims, 18 Drawing Sheets

FOREIGN PATENT DOCUMENTS

| | | |
|---|---|---|
| JP | A-H10-166978 | 6/1998 |
| JP | A-10-315894 | 12/1998 |
| JP | A-11-240411 | 9/1999 |
| JP | A-11-321523 | 11/1999 |
| JP | A-2000-225911 | 8/2000 |
| JP | A-2001-114060 | 4/2001 |
| WO | WO 02/04261 A1 | 1/2002 |
| WO | WO 02/04262 A1 | 1/2002 |
| WO | WO 03/047920 A1 | 6/2002 |

OTHER PUBLICATIONS

U.S. Appl. No. 10/287,762, filed Nov. 5, 2002, Takimoto et al.

U.S. Appl. No. 10/299,657, filed Nov. 20, 2002, Takimoto et al.

Office Action dated Jul. 14, 2005 of Japanese Patent Application No. 2002-098603.

Office Action dated Jul. 14, 2005 of Japanese Patent Application No. 2002-098613.

Fig. 10A
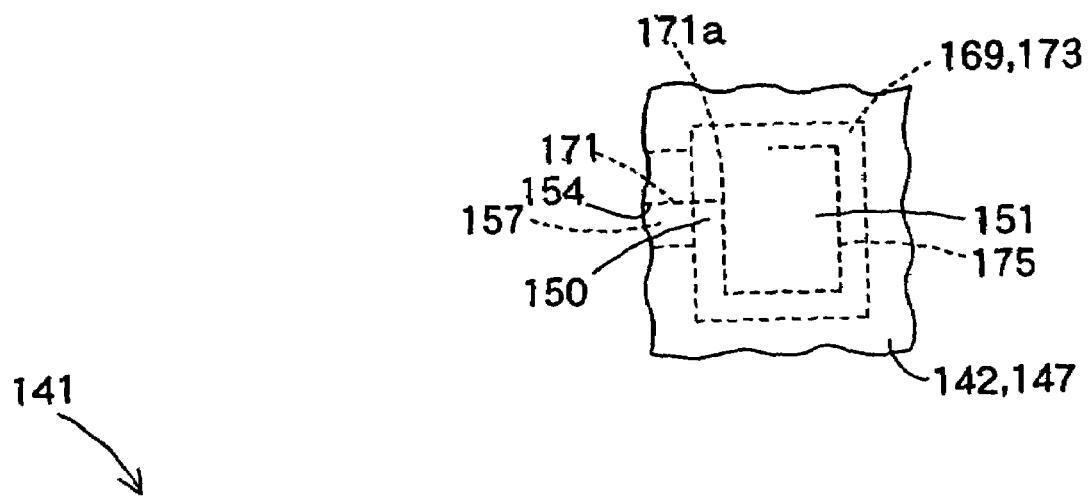
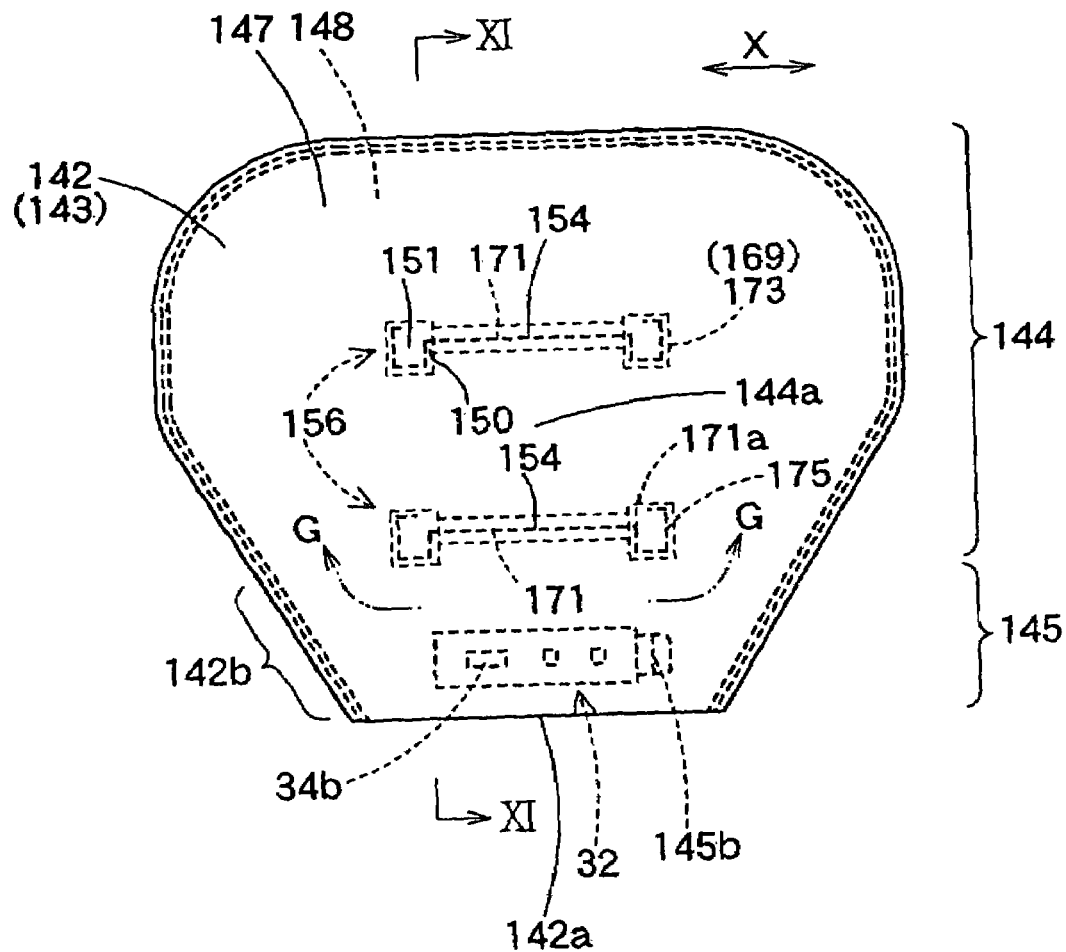
Fig. 10B

AIRBAG DEVICE

The present application claims priority to Japanese patent application of Takimoto et al., filed Apr. 1, 2002, No.2002-98603, and Japanese patent application of Takimoto et al., filed Apr. 1, 2002, No.2002-98613, the entirely of each is hereby incorporated into the present application by this reference.

BACKGROUND OF THE INVENTION

1. Field of the Invention

The present invention relates to an airbag device provided with an airbag, which is expanded and inflated by admitting an inflating gas.

2. Description of the Related Art

In the related art, an airbag device includes an airbag and an inflator housed in the airbag (JP-A-2001-114060). In this airbag device, the airbag is provided with an airbag body forming a bag-shaped outer peripheral wall, and a reinforcing cloth. The reinforcing cloth is arranged on the outer peripheral wall of a portion in the airbag body on the upstream side of the inflating gas. This reinforcing cloth is provided for preventing the gas leakage due to the heat, the pressure or the like which is generated when the inflator is activated, and is arranged to enclose the inflator. Moreover, the reinforcing cloth is sewn at its peripheral edge substantially all over the outer peripheral wall of the airbag body. Usually in this airbag device, at the time of expanding the airbag, the airbag body admits the inflating gas from its downstream portion and inflates the upstream portion apart from the inflator to a large size.

In the airbag device thus constructed, however, the peripheral edge of the reinforcing cloth is sewn substantially in its entirety to the outer peripheral wall of the airbag body. In other words, the outer peripheral wall of the portion in the airbag body on the upstream side of the inflating gas is sewn together with the reinforcing cloth. Therefore, the outer peripheral wall at the portion in the airbag body on the upstream side of the inflating gas is difficult to expand when the airbag inflates so that only the outer peripheral wall at the portion on the downstream side is extended in the direction of the inflating gas. Further, a high tensile stress is applied to the outer peripheral wall forming the downstream portion. If the output of the inflator is increased the more to shorten the time period for the airbag to complete its inflation, for example, the tensile stress to be applied to the outer peripheral wall forming the downstream portion grows even more. With this construction, moreover, if a tether or the like is sewn to the outer peripheral wall of the portion in the airbag body on the downstream side of the inflating gas, the stress concentration may occur in the outer peripheral wall or the portion to be sewn to the tether, and the outer peripheral wall of the airbag may be damaged.

In the airbag device thus constructed, moreover, the airbag is provided with an airbag body and a band-shaped tether made of a flexible cloth member.

The tether has its two lengthwise end portions acting as joint ends to be joined to the airbag body, and regulates the shape of the airbag body having completed its inflation. In other words, the tether in the airbag described in the aforementioned patent is arranged to regulate the thickness of the airbag body and so maintain the plate shape of the airbag body.

However, the tether is subject to a high tension when the airbag body completes its inflation, so that it is easily broken at its end joints.

SUMMARY OF THE INVENTION

The first object of the invention is to provide an airbag device provided with an airbag, which is not easily damaged even if a portion of the airbag on the downstream side of the inflating gas is subject to stress concentration.

Moreover, the second object of the invention is to provide an airbag device, which a simple construction can prevent the joints of a tether to the airbag body from being broken.

The first object of the invention can be achieved by an airbag device having the following construction:

An airbag device comprising: an airbag which expands by admitting inflating gas and an inflator housed in the airbag for feeding the inflating gas to the inside of the airbag, wherein the airbag includes an airbag body forming a bag-shaped outer peripheral wall, and a reinforcing cloth for preventing gas leakage from the airbag body, wherein the reinforcing cloth is joined at its peripheral edge to the outer peripheral wall of the airbag body on the upstream side of the inflating gas, and wherein the reinforcing cloth is jointed to the outer peripheral wall except at the edge portion of the reinforcing cloth which is at the downstream side of the inflating gas.

In the airbag device thus constructed, the reinforcing cloth is joined to the outer peripheral wall at any location except the part of the airbag body on the downstream side of the inflating gas. At the expanding and inflating time of the airbag, therefore, the airbag body can be so inflated that not only the outer peripheral wall forming the portion on the downstream side but also the portion joined to the reinforcing cloth can extend in the inflow direction of the inflating gas. As a result, the outer peripheral wall forming the airbag body is inflated in its entirety in the direction of the inflating gas. As compared with the airbag of the airbag device of the related art, therefore, it is possible to reduce the tensile stress which is applied to the outer peripheral wall forming the downstream portion.

In the airbag device thus constructed, therefore, at the expanding and inflating time of the airbag, the tensile stress to be applied to the outer peripheral wall can be suppressed, even if the stress concentration occurs in the outer peripheral wall at the portion on the downstream side of the inflating gas. Therefore, the outer peripheral wall of the airbag is not easily damaged and can protect the passenger properly.

In the airbag device of the aforementioned construction, moreover, it is preferable:

that the airbag body is formed by joining the peripheral edges of a base cloth forming the outer peripheral wall to each other; and that the reinforcing cloth is joined at its peripheral edge together with the peripheral edge of the base cloth to the airbag body.

With the airbag device being thus constructed, the reinforcing cloth is joined together with the peripheral edges of the base cloth to the airbag body. Therefore, extra operations to join the reinforcing cloth can be eliminated, reducing the number of steps needed for manufacturing the airbag.

On the other hand, the second object of the invention can be achieved by an airbag device having the following construction:

An airbag device comprising an airbag including: a flexible bag-shaped airbag body forming an outer peripheral wall when it completes its inflation; and a tether made of a band-shaped cloth member having such a flexibility as to regulate the shape of the airbag body having completed its inflation, wherein the lengthwise end portions of the tether are joined to the airbag body, wherein the jointed ends of the tether are folded at the edges so that a crease along the lengthwise direction of the tether may be formed on at least one widthwise edge, and wherein the folded portion of the tether cloth member is laid over the airbag body and joined integrally.

In the airbag device thus constructed, on at least one edge of the tether in the widthwise direction at the joint end, the joint is made by using one of the overlapping layers of the folded portion as a contact stress reinforcing (or cushioning) cloth. At the inflation time of the airbag, therefore, a strong impact is cushioned, even if applied to the edge side end portion of the joint portion of the tether joint end to the airbag body, thereby to prevent the breakage of the tether.

Especially, this folded portion is formed by folding the widthwise edge of the tether, not the lengthwise edge, when bonding to the airbag body. Usually, when a tension acts on the tether, the stress concentration easily occurs especially at the widthwise edge of the tether joined to the airbag body. In the airbag device of the aforementioned construction, the folded portion is formed by folding the widthwise edge of the tether. In other words, the folded portion can be arranged all over the length along the lengthwise direction of the tether. Therefore, the stress concentrating on the edge of the tether joined to the airbag body can be dispersed in proportion to the number of layers (sheets) of the folded portion. As a result, the tether in the airbag device of the aforementioned construction can prevent the breakage of the joint portion of the tether to the airbag body better than when the joint to the airbag body is made by folding the lengthwise edge of the tether.

Further, this construction for preventing the breakage of the joint portion of the tether to the airbag body can be easily made merely by folding the widthwise edge of the tether.

In the airbag device thus constructed, therefore, the breakage of the joint portion of the tether to the airbag body can be prevented by that simple construction.

Here, the folded portion of the band-shaped tether may be provided at each of the two widthwise edges of the tether. However, if one of the two widthwise edges of the tether is subject to a higher tension than that of the other edge, the tether may be bonded to the airbag body by forming the folded portion only at one edge.

In the airbag device thus constructed, moreover, it is preferable that a flexible reinforcing cloth is sandwiched between the folded portion in the tether and that portion of the airbag body.

In the airbag device of the aforementioned construction, the reinforcing cloth can act as a cushioning member for the airbag body thereby to prevent the breakage of the joint of the airbag body to the tether.

In the airbag device of the aforementioned construction, moreover, it is preferable that the reinforcing cloth is connected to and integrated with the tether cloth member.

In the airbag device of the aforementioned construction, as compared with the case in which the reinforcing cloth is separate from the tether cloth member, it is easier to arrange or position the tether cloth member and the reinforcing cloth on the airbag body. If the reinforcing cloth is made separate of the tether cloth member, more specifically, it may shift greatly or fall out from between the tether cloth member and the airbag body. With the reinforcing cloth being integrated with the tether cloth member, however, the reinforcing cloth can be prevented from shifting greatly or falling out from between the tether cloth member and the airbag body.

In the airbag device of the aforementioned construction, still moreover, it is preferable that:

the reinforcing cloth is joined to the airbag body by making a peripheral edge joint which joins at its outer peripheral edge to the airbag body; and that the peripheral edge joint is arranged to enclose the edge portion of the tether joined to the airbag body.

In the airbag device of the aforementioned construction, it is made hard for tension of the entirety of the airbag body at the inflating time to propagate to the area enclosed by the reinforcing cloth. Because, the peripheral edge joint is arranged at the outer peripheral edge of the reinforcing cloth. Therefore, it is also hard for the tension of the entirety of the airbag body to propagate to the edge portion of the tether joined to the airbag body. As a result, the joint between the edge folded portion of the tether and the airbag body is strengthened.

In the airbag device of the aforementioned construction, moreover, it is preferable that the joined portion of the tether to the airbag body and the peripheral edge joint portion of the reinforcing cloth are formed by sewing them continuously with a sewing thread.

In the airbag device of the aforementioned construction, the joint of the tether to the airbag body and the peripheral edge joint of the reinforcing cloth are formed by one sewing operation with a continuous sewing thread. In other words, these joint portions can be formed by a continuous operation without cutting the sewing thread. Therefore, the work of joining the reinforcing cloth or the tether to the airbag body can be simply done.

In the airbag device of the aforementioned construction, moreover, it is preferable:

that the portion of the tether joined to the airbag body is formed by sewing it with a sewing thread, and that the portion of the joint near the its end is formed in an arc-like curve.

In the airbag device of the aforementioned construction, the portion of the joint at the end formed by sewing with the sewing thread is formed in an arc-like curve. Therefore, even if a high stress is concentrated near the joint end, it can be coped with more effectively to prevent the breakage of the joined portion of the tether to the airbag body.

BRIEF DESCRIPTION OF THE DRAWINGS

FIG. 10A is a front elevation of an airbag used in the second embodiment;

FIG. 10B is an enlarged view of a portion of FIG. 10A;

DESCRIPTION OF THE PREFERRED EMBODIMENTS

Figure 1:
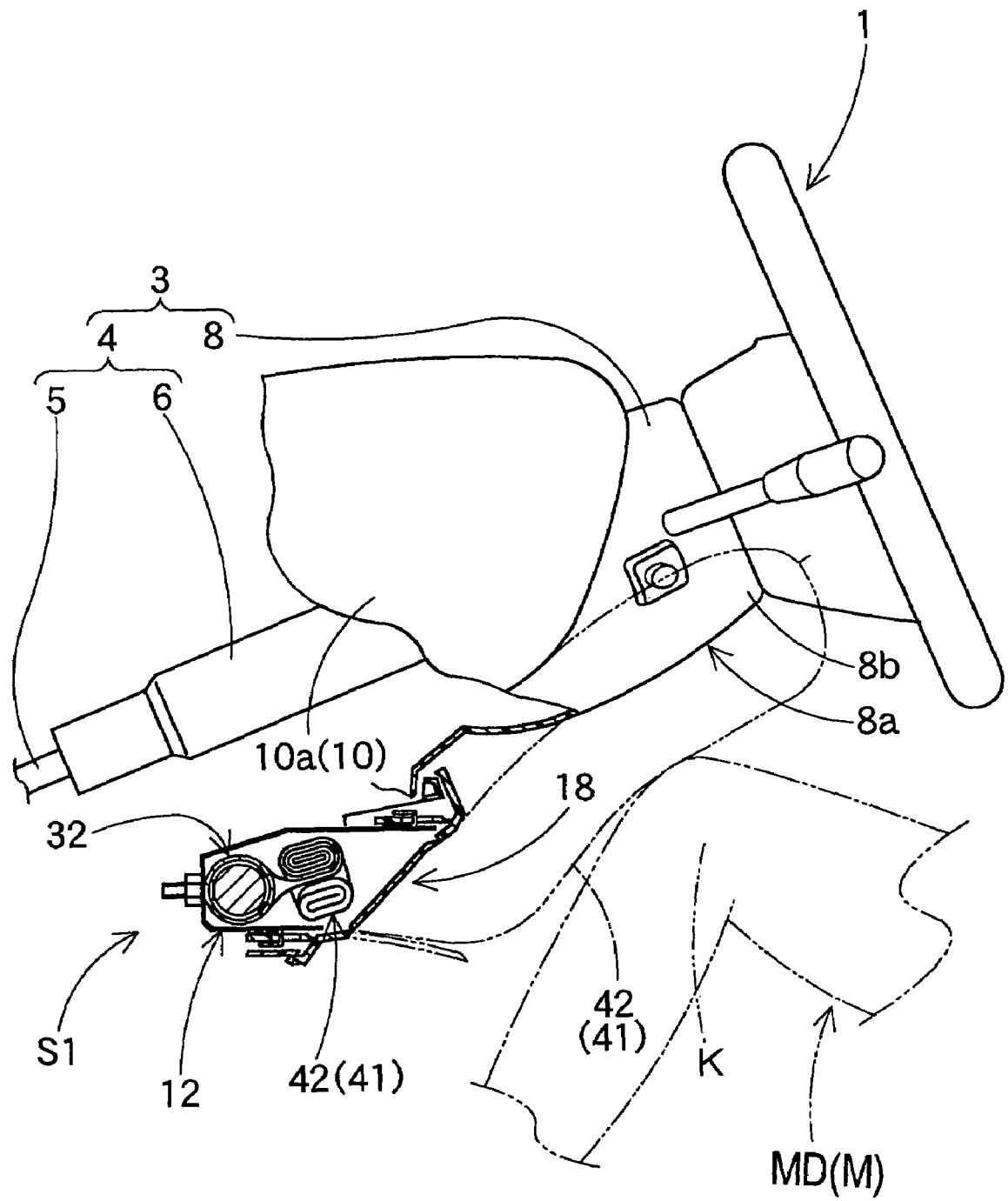
FIG. 1 is a schematic longitudinal section showing use of a knee protecting airbag device according to a first embodiment of the invention.

The invention will be described below by way of embodiments shown in the drawings. In addition, the invention is not limited to the embodiments. All modification within the requirements of the claims and equivalents with respect to the requirements should be included in the scope of the claims.

One embodiment of the invention will be described with reference to the accompanying drawings.

The description will be started with an airbag device S1 capable of achieving the first object of the invention.

The first embodiment will be described by taking up the knee protecting airbag device S1 as an example. This knee protecting airbag device S1 is so arranged below a steering column 3 on the vehicular front side of a driver MD (or a passenger M) that it may be able to protect the knees K of the driver MD.

Here, the vertical, transverse and longitudinal directions used herein correspond to the vertical, transverse and longitudinal directions of the vehicle at the time when the knee protecting airbag device S1 is mounted on the vehicle. The steering column 3 is provided, as shown in FIG. 1, with a column body 4 connected to a steering wheel 1, and a column cover 8 arranged to cover the column body 4 below the steering wheel 1.

The column body 4 is provided with a main shaft 5 and a column tube 6 surrounding the main shaft 5. Between the main shaft 5 and the column tube 6, there are arranged the not-shown tilt mechanism for adjusting the angle of the ring face of the steering wheel 1, the not-shown telescopic mechanism for moving and stopping the steering wheel 1 in the axial direction of the shaft, and so on.

The column cover 8 is formed of a synthetic resin into a generally square cylinder shape and is so arranged in the axial direction of the column body 4 as to cover the column body 4. That portion of the column cover 8, which protrudes from an instrument panel (hereafter abbreviated to "panel") 10, has a lower face 8a of a generally rectangular shape. Further, the lower face 8a of the column cover 8 is curved so that its vehicular rear portion rises.

The knee protecting airbag device S1 is provided with a folded airbag 41, an inflator 32 for feeding the airbag 41 with an inflating gas, a case 12 opening on the vehicular rear side, and an airbag cover 18 for covering the vehicular rear side of the case 12. The case 12 houses the folded airbag 41 and the inflator 32.

Figure 2:
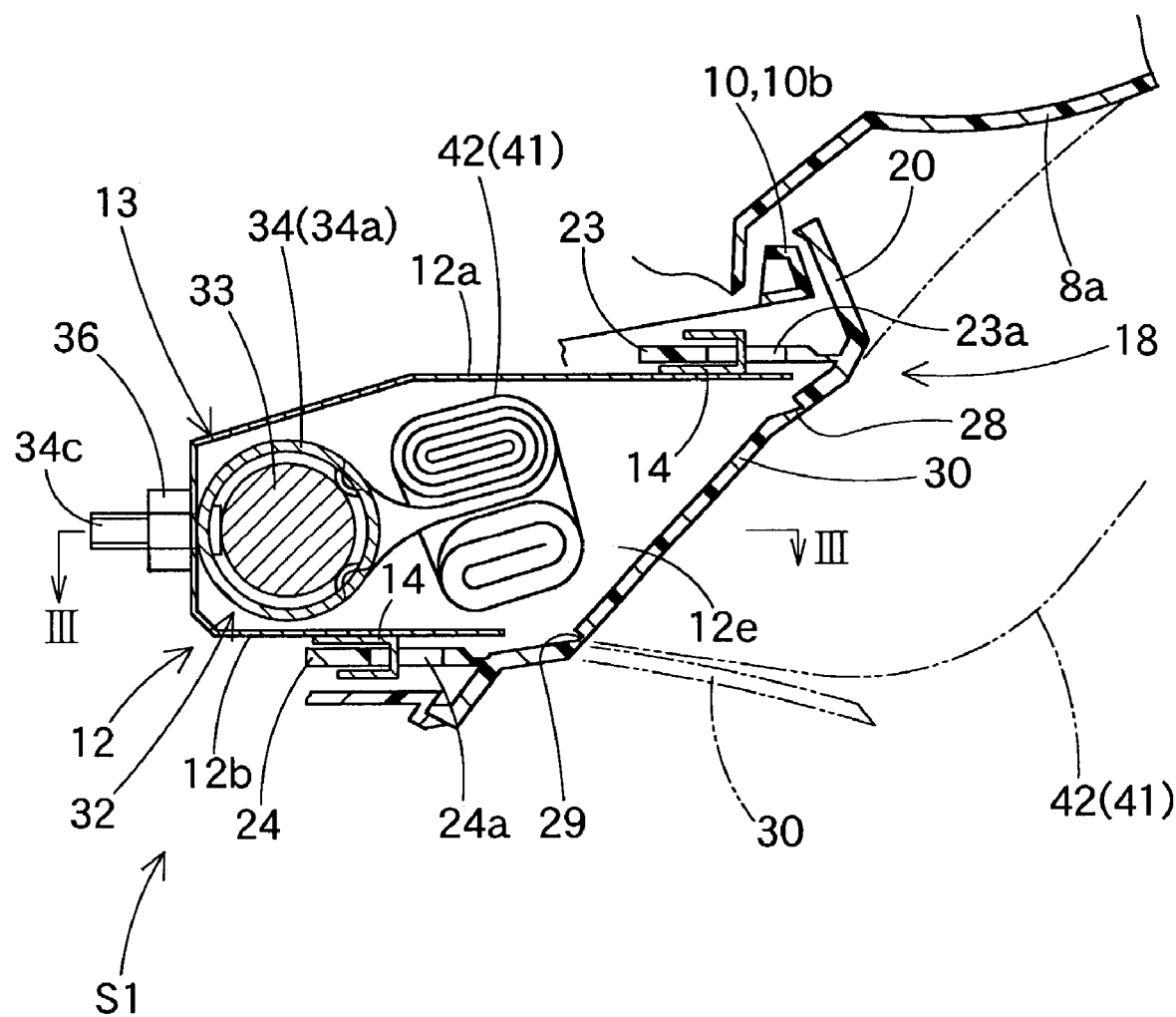
FIG. 2 is an enlarged longitudinal schematic section of the knee protecting airbag device of the first embodiment.
Figure 3:
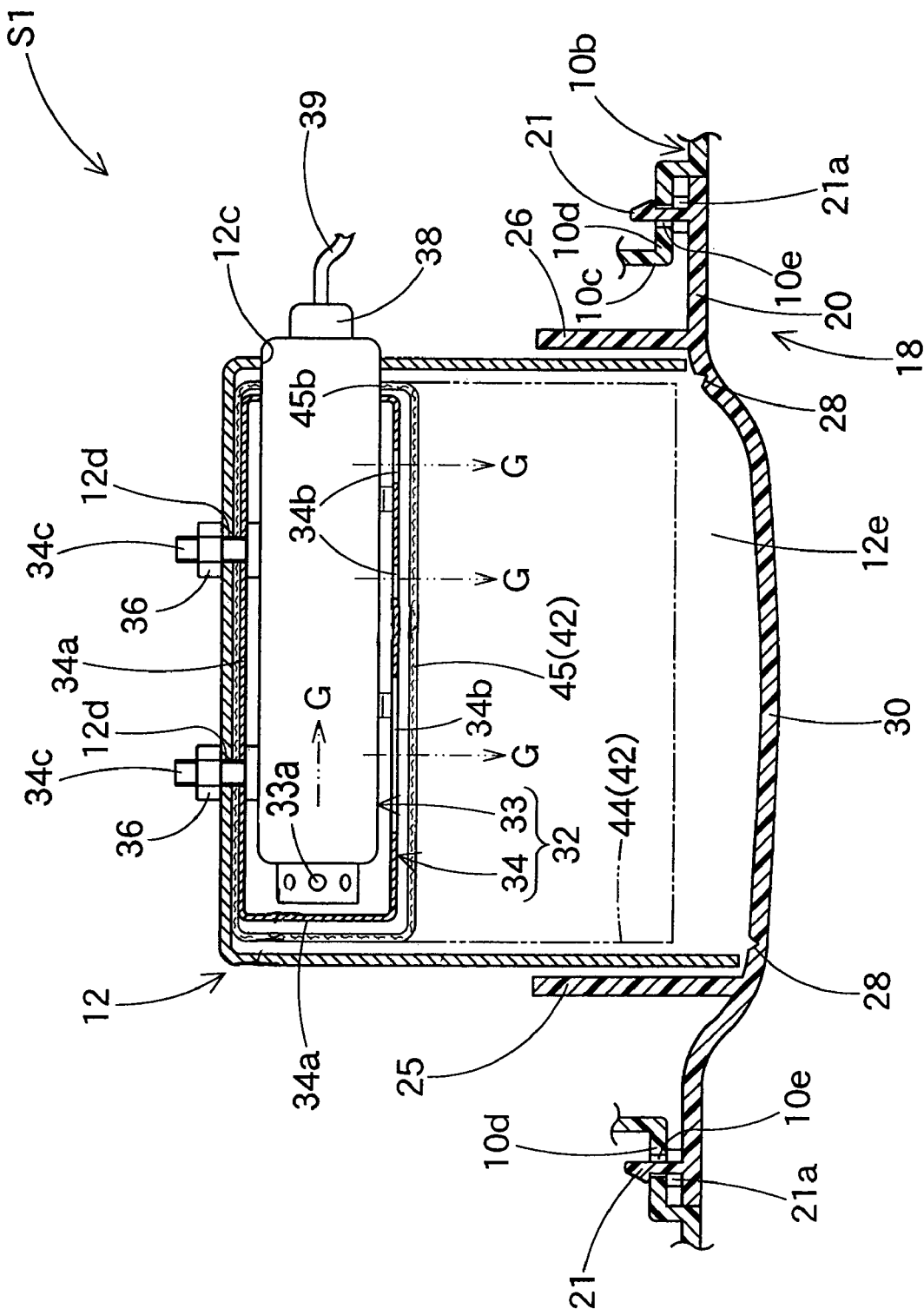
FIG. 3 is a cross section at the line III—III of FIG. 2.

The case 12 is made of a sheet metal and formed into a box shape having an opening 12e on the vehicular rear side. The case 12 is arranged on the lower side of the steering column 3, as shown in FIGS. 1 to 3. On the outer peripheries of upper and lower wall portions 12a and 12b of the case 12, there are fixed a plurality of hooks 14. Each hook 14 is formed to have a generally C-shaped section. In the case 12, moreover, there are formed insert holes 12c and 12d (FIG. 3). The insert hole 12c is provided for inserting the end portion of the later-described body 33 of the inflator 32. The insert holes 12d are provided for inserting the later-described bolts 34c of the inflator 32. This case 12 is connected to and fixed on the not-shown panel reinforcement by making use of a not-shown bracket. The panel reinforcement is arranged near the column body 4.

The airbag cover 18 is made of a thermoplastic polyolefin elastomer. The airbag cover 18 can cover the vehicular rear side of the case 12.

In the case of the embodiment, the panel 10 is constructed of an upper panel 1a and a lower panel 10b. Further, the airbag cover 18 is arranged at the lower panel 10b side which is the peripheral edge of the column cover 8. The airbag cover 18 covers the lower side peripheral edge of the column cover 8 protruding from the panel 10. The airbag cover 18 is provided with a door portion 30 covering the opening 12e of the case 12, and a general portion 20 surrounding the door portion 30.

The door portion 30 is formed slightly larger than the opening 12e of the case 12. The door portion 30 is formed into a generally rectangular plate shape for covering the opening 12e. At the lower end of the door portion 30, there is arranged a hinge portion 29 for providing a pivot at the time when the door portion 30 opens. Moreover, a thinned breakaway portion 28 is arranged in the outer peripheral edge of the door portion 30 excepting the hinge portion 29 in an inverted U-shape.

At the portions of the general portion 20 near the peripheral edge of the door portion 30, there are arranged four side wall portions 23, 24, 25 and 26. These individual side wall portions 23, 24, 25 and 26 protrude to the vehicular front at the outer side of the case 12. And, the upper side wall portion 23 arranged on the upper side of the case 12 and the lower side wall portion 24 arranged on the lower side of the case 12 are the connection wall portions for connecting the airbag cover 18 to the case 12. In the upper side wall portion 23 and the lower side wall portion 24, respectively, there are formed retaining holes 23a and 24a. These individual retaining holes 23a and 24a are retained at their peripheral edges on the hooks 14 of the case 12.

At predetermined positions in the general portion 20, moreover, there are formed mounting leg portions 21, which extend to the vehicular front side. These mounting leg portions 21 are provided to mount and fix the airbag cover 18 on the lower panel 10b. The mounting leg portions 21 are retained on the circumferential edges of the retaining holes 10e of the lower panel 10b. This lower panel 10b is provided with a housing recess 10c for housing the case 12. The retaining holes 10e are formed (FIG. 3) in a flange portion 10d formed on the peripheral edge of the housing recess 10c. At the root portions of the mounting leg portions 21, moreover, there are formed ribs 21a. These ribs 21a are provided for abutting against the flange portion 10d of the lower panel 10b to support the general portion 20 when they are retained in the retaining holes 10e of the mounting leg portions 21.

The inflator 32 is of the cylinder type, in which its axial direction is arranged in the transverse direction of the vehicle, as shown in FIGS. 1 to 3. The inflator 32 is provided with the body 33 of generally cylindrical shapes and a diffuser 34. At one end of the body 33, there are formed a plurality of gas discharge ports. At another end of the body 33, there is connected a connector 38, with which an activation signal inputting lead wire 39 is connected. The diffuser 34 is provided with a holding cylinder portion 34a made of a sheet metal, and a plurality (two in the embodiment) of bolts 34c protruding through the holding cylinder portion 34a. This holding cylinder portion 34a is formed into a generally cylindrical shape so that it can cover the body 33. In the face of the holding cylinder portion 34 on the vehicular rear side in the vehicle-mounted state, there are opened a plurality of gas outlet ports 34b. These gas outlet ports 34b enable the inflating gas discharged from the gas discharge port 33a of the body 33 to flow out.

Here, the activation signals are inputted through the lead wire 39 not only to that inflator 32 but also to the not-shown airbag device mounted on the steering wheel 1, when an airbag activating circuit mounted on the vehicle detects a front collision of the vehicle.

Figure 5:
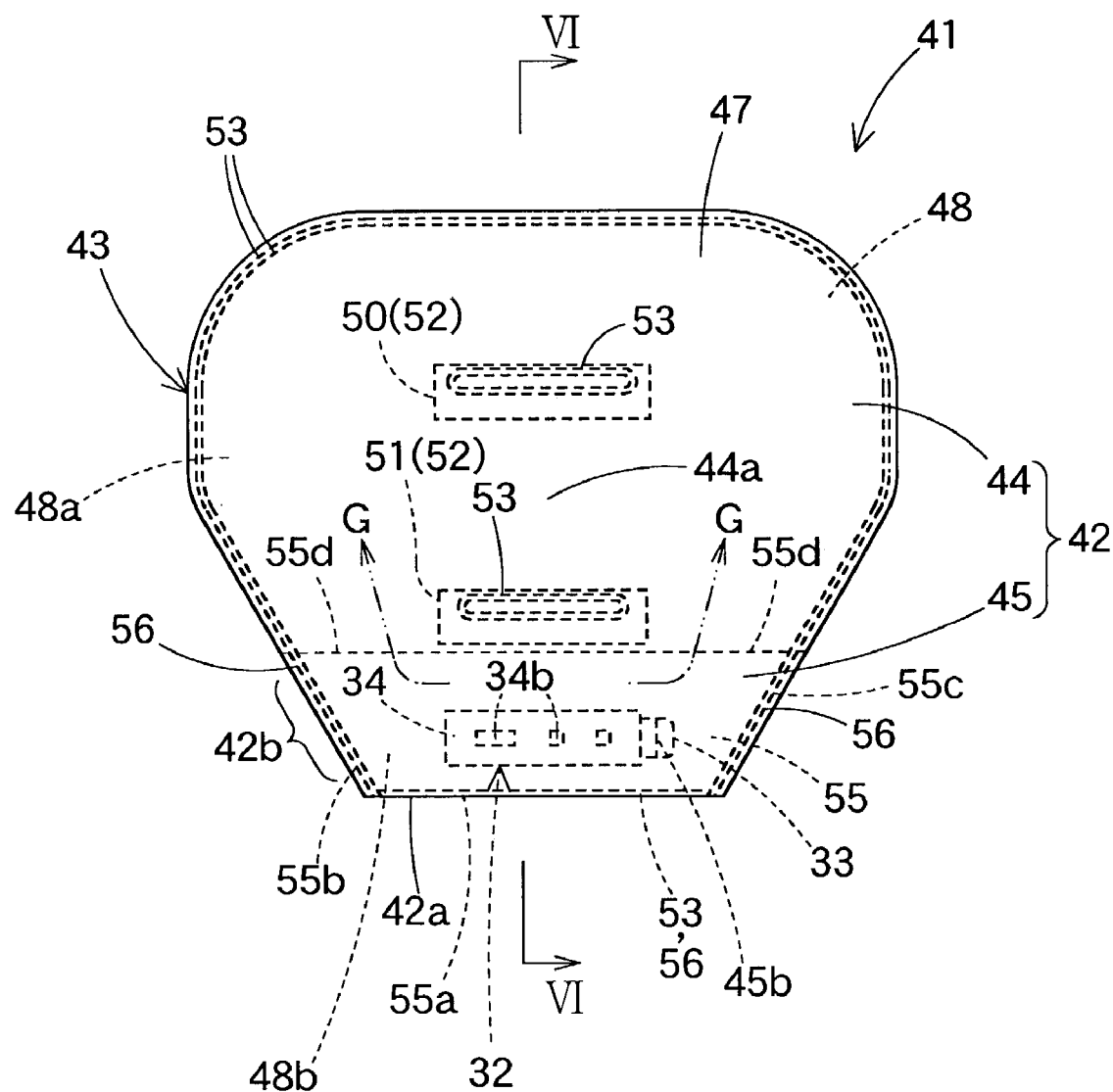
FIG. 5 is a front elevation of an airbag used in the first embodiment.
Figure 6:
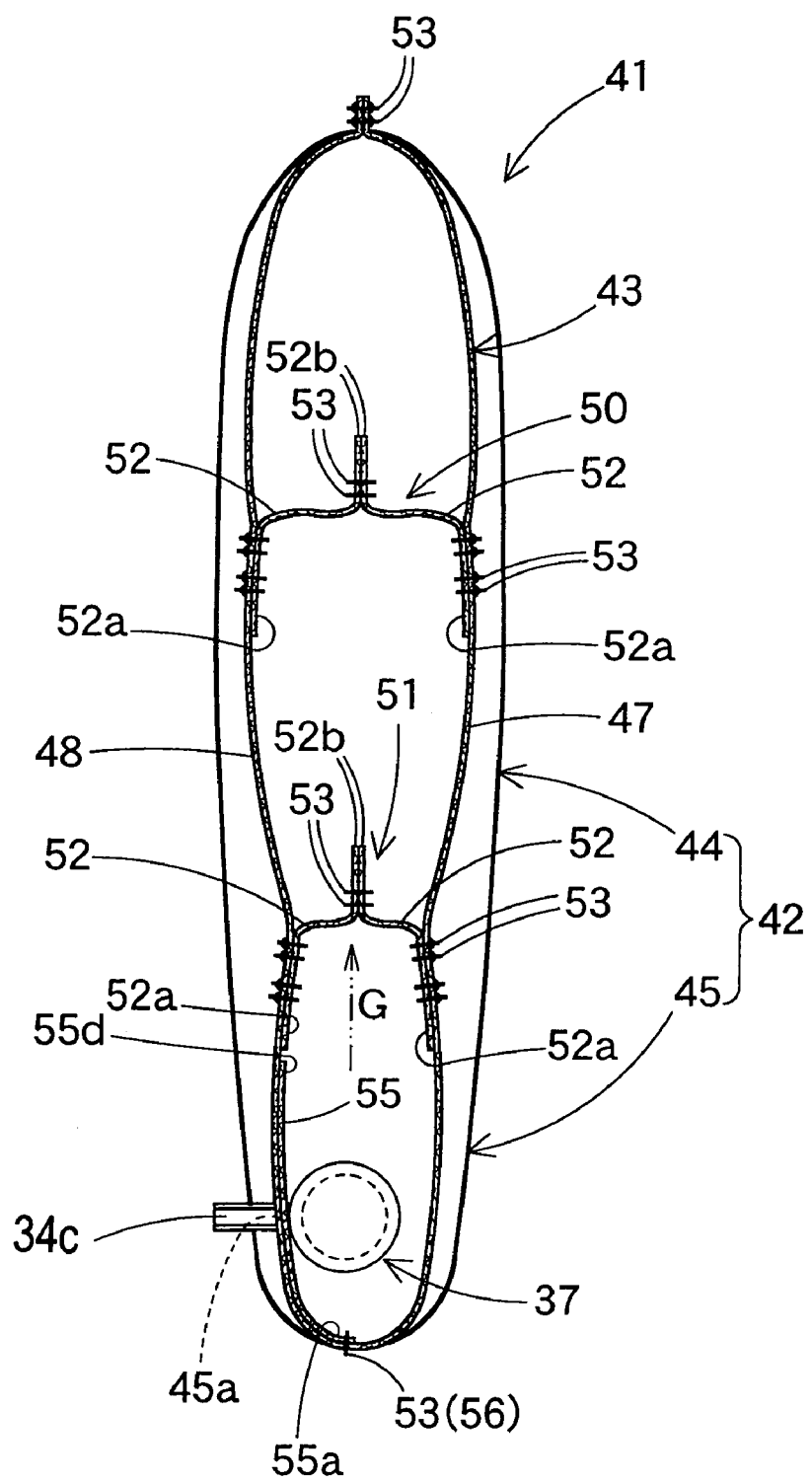
FIG. 6 is an enlarged schematic section of cross section VI—VI of FIG. 5.

The airbag 41 is provided with an airbag body 42 constructed of a bag-shaped outer peripheral wall and a reinforcing cloth 55 for preventing the gas leakage from the airbag body 42. The airbag body 42 is formed of one sheet of woven fabric made of flexible polyester or polyamide yarns or the like. Further, the airbag body 42 takes a generally trapezoidal plate shape, as shown in FIGS. 5 and 6, when it is completely expanded and inflated. Moreover, the airbag body 42 is provided with a mounting portion 45 located on the side of its lower end 42a for mounting the inflator 32, and an inflation portion 44 arranged on the upper side of the mounting portion 45. The inflation portion 44 is set to have a transverse width size larger than that of the mounting portion 45. This mounting portion 45 is located at a portion on the upstream side of an inflating gas G with respect to the inflation portion 44. The mounting portion 45 is housed in the case 12 when the airbag 41 completes its inflation, and is held in the case 12 by the inflator 32. The inflation portion 44 is located on the downstream side of the inflating gas G with respect to the mounting portion 45, and it protrudes from the case opening 12e to protect the knees of the driver MD, when the airbag 41 expands. Moreover, the inflation portion 44 can cover the column cover lower face 8a to the vicinity of the upper end 8b when the airbag 41 is completely inflated.

Moreover, the airbag 41 is formed in the following manner. At first, an airbag body base cloth 43, which is a sheet of woven fabric comprising the outer peripheral wall of the airbag body 42, is folded back at the portion to become the lower end 42a of the airbag body 42. With a sewing thread 53, moreover, the reinforcing cloth 55 and later-described tethers 50 and 51 are individually sewn to the airbag body base cloth 43. After this, the peripheral edges of the portions opposed to each other when the airbag body base cloth 43 is folded back, are sewn together with the sewing thread 53, thus forming the airbag 41. And, the airbag body 42 includes a passenger side wall portion 47 and a vehicle side wall portion 48 each having a general sector shape. The passenger side wall portion 47 forms the outer peripheral wall on the side of the driver MD. The vehicle side wall portion 48 forms the outer peripheral wall facing the column cover 8.

In the portion of the mounting portion 45 on the lower side of the vehicle side wall portion 48, there are formed two insertion holes 45a and 45a and one insertion hole 45b. The insertion holes 45a and 45a are provided for inserting the individual bolts 34c of the inflator 32. The insertion hole 45b is provided for inserting the body 33 of the inflator 32.

In the inflation portion 44 of the airbag body 42, moreover, there are arranged the band-shaped tethers 50 and 51, in a forward row and a rear row each extending in the vehicular transverse direction. These tethers 50 and 51 are so arranged that the inflation portion 44 may keep the plate shape of the airbag body 42 without increasing the thickness of the vicinity of a central portion 44a when the airbag 41 completes its inflation. Therefore, the tethers 50 and 51 are arranged near the central portion 44a of the inflation portion 44.

Each of the tethers 50 and 51 is formed of two tether cloth members 52 and 52. Specifically, each tether 50 or 51 is formed by sewing the ends 52a of each tether cloth member 52 to the passenger side wall portion 47 and the vehicle side wall portion 48 respectively with the sewing thread 53, and by sewing the other ends 52b and 52b to each other with the sewing thread 53. Here, the tether cloth members 52 are formed, like the airbag body 42, of the woven fabric of flexible polyester or polyamide yarns or the like.

Like the airbag body 42, the reinforcing cloth 55 is formed of the woven fabric of flexible polyester or polyamide yarns or the like. The reinforcing cloth 55 is arranged in the airbag body 42 at that portion of the vehicle side wall portion 48 comprising the mounting portion 45 or the upstream portion of the inflating gas G. The reinforcing cloth 55 is formed into a generally trapezoidal shape so as to match the shape of the portion of the vehicle side wall portion 48 comprising the mounting portion 45 of the airbag body 42. The reinforcing cloth 55 is arranged for preventing the gas leakage, which might otherwise be caused by the heat or pressure generated by action of the inflator 32. In the case of the embodiment, the reinforcing cloth 55 is arranged to cover the inner peripheral side of the vehicle side wall portion 48. In the reinforcing cloth 55, moreover, not-shown insertion holes are so formed at positions corresponding to the insertion holes 45a for inserting the bolts 34c of the inflator 32. The reinforcing cloth 55 is joined at its peripheral edge to the vehicle side wall portion 48. In the case of the embodiment, the reinforcing cloth 55 is sewn to the vehicle side wall portion 48 by sewing left and right edge portions 55b and 55c with the confronting the peripheral edge of the base cloth 43, when the peripheral edges of the base cloths 43 are to be sewn with the sewing thread 53 at the time of manufacturing the airbag 41. At this time, the reinforcing cloth 55 is sandwiched between the base cloth 43. Moreover, the lower edge 55a of the reinforcing cloth 55 is sewn to the vicinity of the lower end 42a of the airbag body 42 by means of the sewing thread 53. Moreover, the upper edge 55d of the reinforcing cloth 55 which is located on the side of the inflation portion 44 of the airbag body 42 downstream of the inflating gas G is not sewn to the vehicle side wall portion 48. In other words, in the embodiment, the sewn portion (or joined portion) 56 sewing the reinforcing cloth 55 to the vehicle side wall portion 48 is arranged in a general U-shape (FIG. 5), except for its upper edge 55d.

Here will be described how to assemble this airbag device S1. At first, the end portions 52a of the tether cloth members 52 and the lower edge 55a of the reinforcing cloth 55 are sewn by means of the sewing thread 53 to the predetermined portions of the base cloth 43 to construct the airbag body 42. Then, the end portions 52b of the tether cloth members 52 are sewn to each other by means of the sewing thread 53 to form the tethers 50 and 51. After this, the base cloth 43 is folded back at the portion for the lower end 42a of the airbag body 42. At this time, the left and right edge portions 55b and 55c of the reinforcing cloth 55 are each put between the confronting peripheral edges of the base cloth 43 which will form the passenger side wall portion 47 and the vehicle side wall portion 48. Then, the peripheral edges of the base cloth 43 are sewn together with the edge portions 55b and 55c to each other by means of the sewing thread 53, thus forming the airbag 41. At this time, not-sewn portion 42b (FIG. 5) is left not sewn. Then, the inflator 32 is housed from the not-sewn portion 42b, and the individual bolts 34c are protruded through the insertion holes 45a. At the same time, the base of the inflator body 33 is protruded from the insertion hole 45b. After this, the not-sewn portion 42b of the airbag body 42 is sewn to manufacture the airbag 41.

Next, the airbag 41 is folded up. This airbag 41 is wrapped, after folding, with the not-shown breakable wrapping film for preventing the airbag 41 from collapsing. At this time, the bolts 34c of the inflator 32 and the end portion of the body 33 protruding from the insertion holes 45a and 45b are protruded from the wrapping film.

Next, the inflator 32 is housed together with the folded airbag 41 in the case 12 by protruding the individual bolts 34c of the inflator 32 from the insertion holes 12d of the case 12 and by protruding the end portion of the inflator body 33 from the insertion hole 12c of the case 12. Then, nuts 36 are fastened on the individual bolts 34c, so that the inflator 32 and airbag 41 can be housed and mounted in the case 12.

After this, the not-shown bracket of the case 12 is mounted on the panel reinforcement of the vehicle, on which the upper panel 10a and the lower panel 10b have already been mounted. Then, the connector 38 with the lead wire 39 connected is connected to the body 33 of the inflator 32. Next, the airbag cover 18 is pushed to the vehicular front side, and the individual mounting leg portions 21 are inserted and retained in the retaining holes 10e of the lower panel 10b. At the same time, the hooks 14 of the case 12 are retained in the individual retaining holes 23a and 24a of the upper wall 23 and the lower wall 24 thereby to connect the airbag cover 18 to the case 12. As a result, the airbag device S1 can be mounted on the vehicle.

Figure 4:
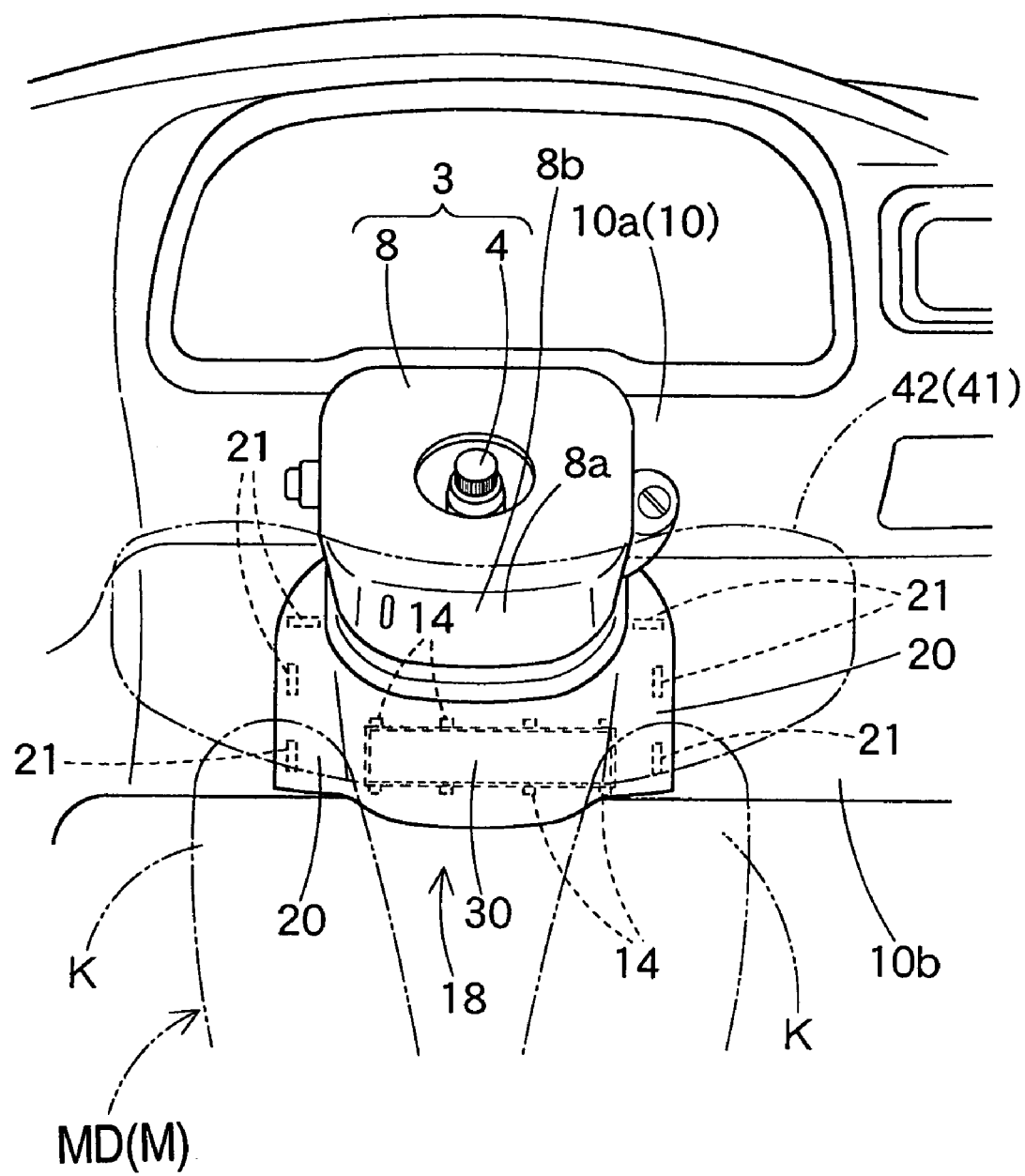
FIG. 4 is a schematic external view of the use of the knee protecting airbag device of the first embodiment taken from the rear side of the vehicle.

If the activation signals are inputted through the lead wire 39 to the body 33 of the inflator 32 after the airbag device S1 was mounted on the vehicle, the inflating gas G is discharged from the gas discharge ports 33a of the inflator 32. Then, the inflating gas G flows through the gas discharge ports 34b of the diffuser 34 into the inflation portion 44 of the airbag body 42. The airbag body 42 is inflated and so breaks the not-shown wrapping film and pushes the door portion 30 of the airbag cover 18. Then, the airbag body 42 breaks the breakaway portion 28 and opens the door portion 30 downward pivoting on the hinge portion 29. As a result, the airbag body 42 (or the airbag 41) is expanded and inflated largely upward along the column cover lower face 8a, as indicated by double-dotted lines in FIGS. 1 and 4.

In the airbag device S1 of the embodiment, the reinforcing cloth 55, which is joined at its peripheral edge to the vehicle side wall portion 48b forming the mounting portion 45 (the upstream portion of the inflating gas G in the airbag body 42) is joined at its sewn portion 56 to the vehicle side wall portion 48b, excepting the upper edge 55d on the side of the inflation portion 44 (downstream the inflating gas G in the airbag body 42). In short, in the airbag device S1 of the embodiment, the reinforcing cloth 55 is sewn at its lower edge 55a and its two left and right edges 55b and 55c to the vehicle side wall portion 48. At the expanding and inflating time of the airbag 41, therefore, the airbag body 42 can be so inflated that not only a portion 48a of the vehicle side wall portion 48 forming the inflation portion 44 (downstream the inflating gas G) but also the vehicle side wall portion 48b with the reinforcing cloth 55 overlapping can extend in the direction of the inflating gas G, i.e., in the vertical direction. As a result, the vehicle side wall portion 48 constructing the airbag body 42 extends along the inflow direction of the inflating gas G. As compared with the airbag of the related art, in which the outer peripheral edge of the reinforcing cloth is joined substantially in its entirety to the airbag body base cloth, therefore, it is possible to reduce the tensile stress which is applied to the outer peripheral wall (or the vehicle side wall portion 48a) forming the inflation portion 44 downstream the inflating gas G.

In the airbag device S1 of the embodiment, moreover, the tethers 50 and 51 are sewn to the vehicle side wall portion 48a of the inflation portion 44, downstream the inflating gas G in the airbag 41. With the airbag body 42 being thus constructed, however, at the expanding time of the airbag 41, it is possible to reduce the tensile stress, especially the tensile stress in the vertical direction, to be applied to the vehicle side wall portion 48a comprising the inflation portion 44 downstream. In the airbag 41 in the airbag device S1 of the embodiment, therefore, the stress concentration hardly occurs at the sewn portion joining the tethers 50 and 51 and the vehicle side wall portion 48. As a result, it is possible to prevent the damage on the vehicle side wall portion 48 of the airbag body 42.

In the airbag device S1 of the embodiment, therefore, at the expanding time of the airbag 41, the tensile stress to be applied to the vehicle side wall portion 48a at the inflation portion 44 downstream the inflating gas G can be suppressed, even if the vehicle side wall portion 48a has a portion where the stress is easily concentrated. Therefore, the vehicle side wall portion 48 constructing the airbag 41 is difficult to damage and can protect the passenger properly.

In the airbag device S1 of the embodiment, moreover, the left and right edges 55b and 55c of the reinforcing cloth 55 are sewn at the time of manufacturing the airbag 41 together with the peripheral edges of the airbag body base cloth 43 to each other and to the airbag body 42. Therefore, the extra work of sewing the reinforcing cloth 55 can be eliminated to reduce the number of steps of manufacturing the airbag 41.

Figure 7:
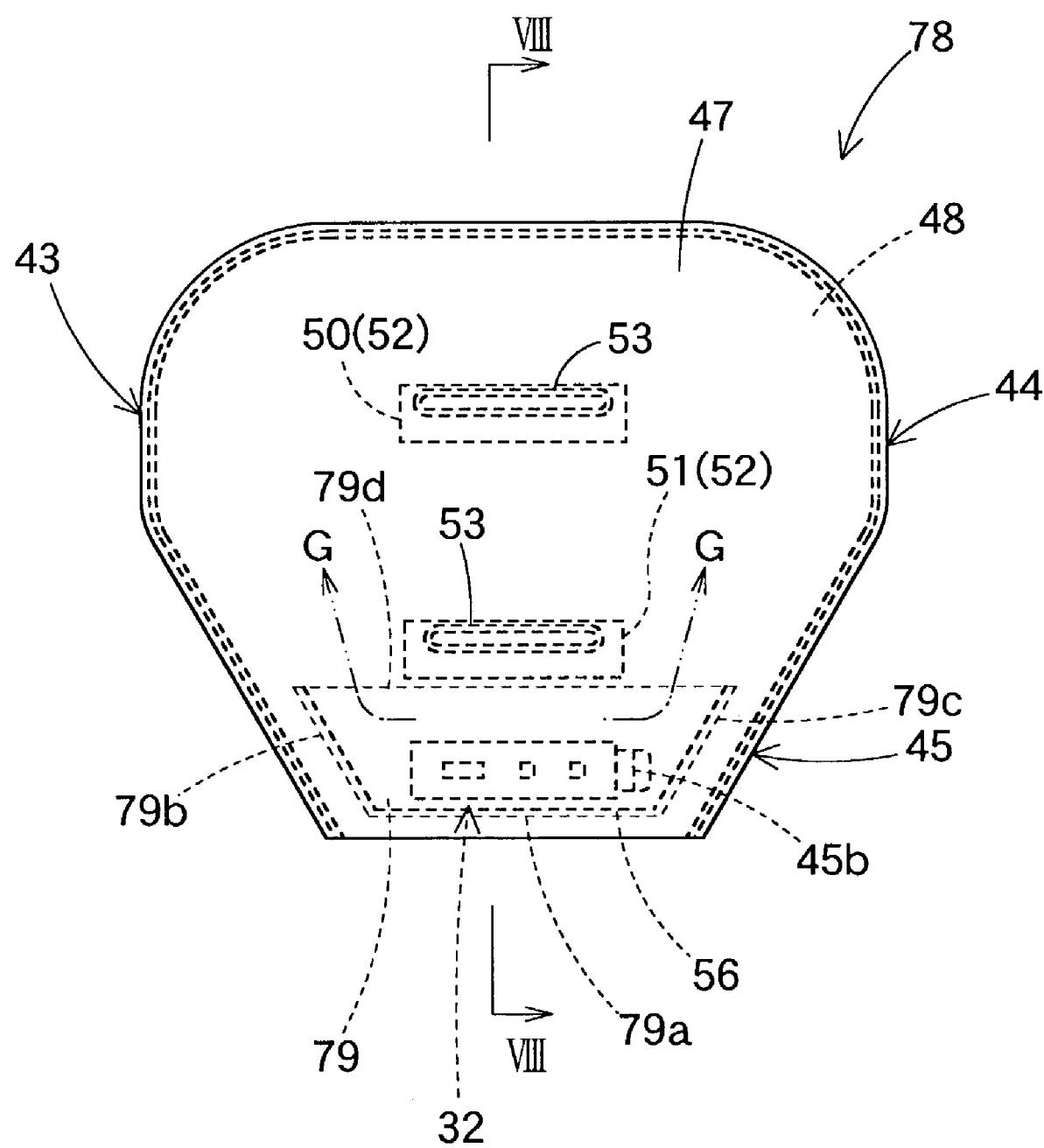
FIG. 7 is a front elevation showing a modification of the airbag used in the first embodiment.
Figure 8:
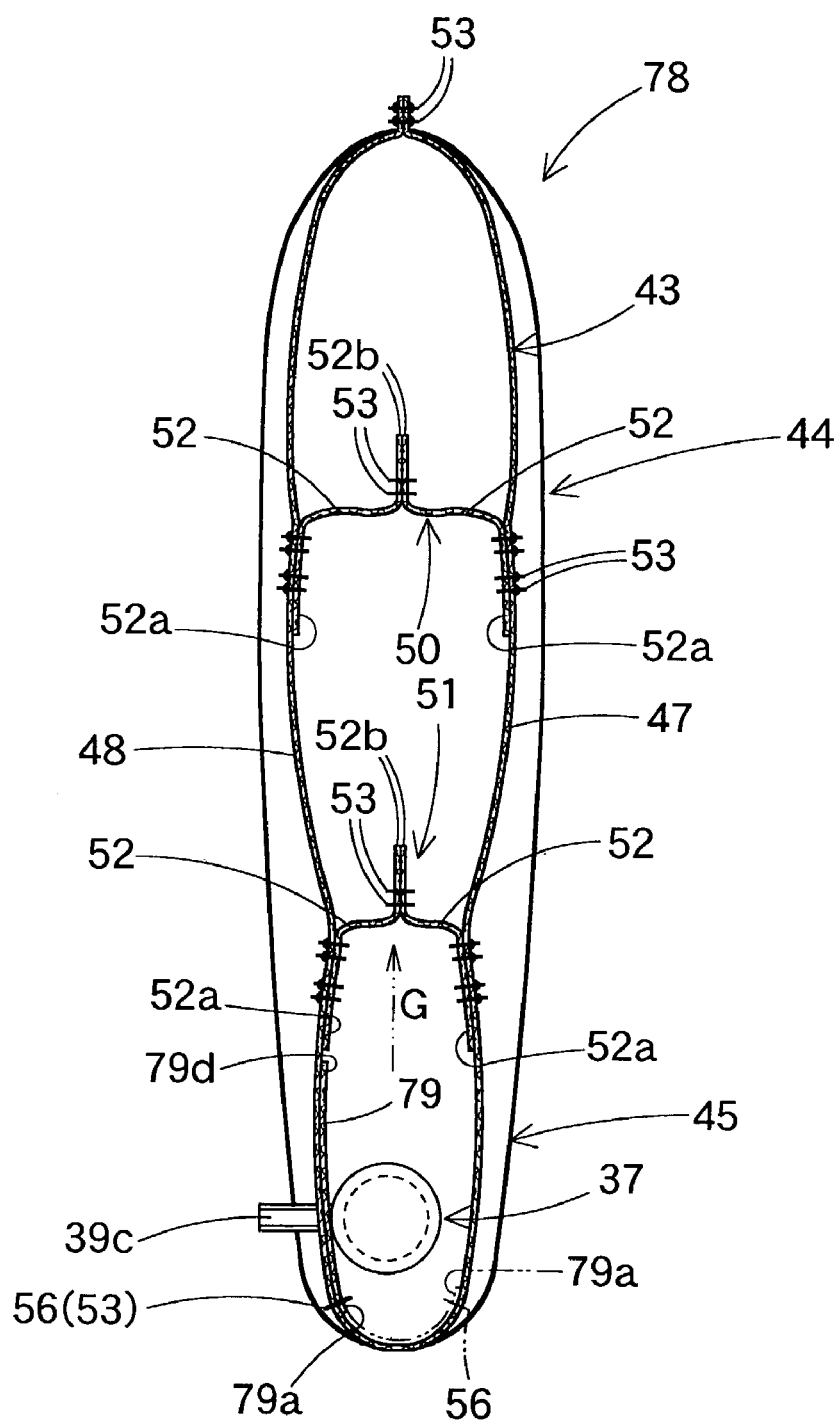
FIG. 8 is an enlarged schematic cross section of portion VIII—VIII of FIG. 7.

If this point is not considered important, it is naturally possible to use a construction shown in FIGS. 7 and 8, as an airbag 78. This airbag 78 has a construction similar to the aforementioned airbag 41 except for the reinforcing cloth 79. Therefore, similar portions will not be described, designating the common members by common reference numerals. The reinforcing cloth 79 is set to have a vehicular transverse width size smaller than that of the mounting portion 45. Moreover, the reinforcing cloth 79 is set to have the transverse width size capable of covering the vehicle side wall portion 48 side of the inflator 32. This reinforcing cloth 79 is formed with its lower edge 79a on the rear side of the lower end 42a of the airbag body 42. Further, the sewn portion 56 of the reinforcing cloth 79 is arranged at its lower edge 79a and at its two left and right edges 79b and 79c and not at its upper edge 79d toward the inflation portion 44. Here, the lower edge 79a of the reinforcing cloth 79 may be sewn to a portion of the passenger side wall portion 47 on the other side of the lower end 42a of the airbag body 42, as indicated by the double-dotted line in FIG. 8. In case the reinforcing cloth 79 is thus formed, its lower edge 79a is set at such a position that it may not obstruct the extension of the passenger side wall 47 as a whole when the airbag 41 is inflated with the inflating gas G.

Moreover, the reinforcing cloth to be used may have a construction covering the inner side of the vehicle side wall portion 48 and the inner side of the passenger side wall portion 47 in the mounting portion 45. Specifically, the reinforcing cloth may be constructed to have a sectional shape of the longitudinal direction of the vehicle generally in such a U-shape in the airbag body 42 as to enclose the inflator 32. In case the reinforcing cloth is thus constructed, it is sufficient that the reinforcing cloth is joined to the airbag body base cloth 43 only on the left and right edge sides.

Here in the embodiment, the reinforcing cloths 55 and 79 are arranged inside the airbag body 42. Naturally, the reinforcing cloths 55 and 79 may be constructed to cover the outer side of the airbag body 42.

In the embodiment, moreover, the sewing thread 53 is used as the joint means at the time of manufacturing the airbags 41 and 78. However, the joint means should not be limited thereto and instead the airbag may be manufactured with an adhesive or the like.

In the first embodiment, moreover, the knee protecting airbag device S1 has been described by way of example. The airbag device, to which the construction of the first embodiment can be applied, should not be limited thereto. The airbag device having the construction of the first embodiment can be applied as long as it is constructed to house the inflator in the airbag. Specifically, the airbag device of the construction of the first embodiment can be applied to a side collision airbag device or the like.

Next, the description will be made of an airbag device S2 capable achieving the second object of the invention.

Figure 9:
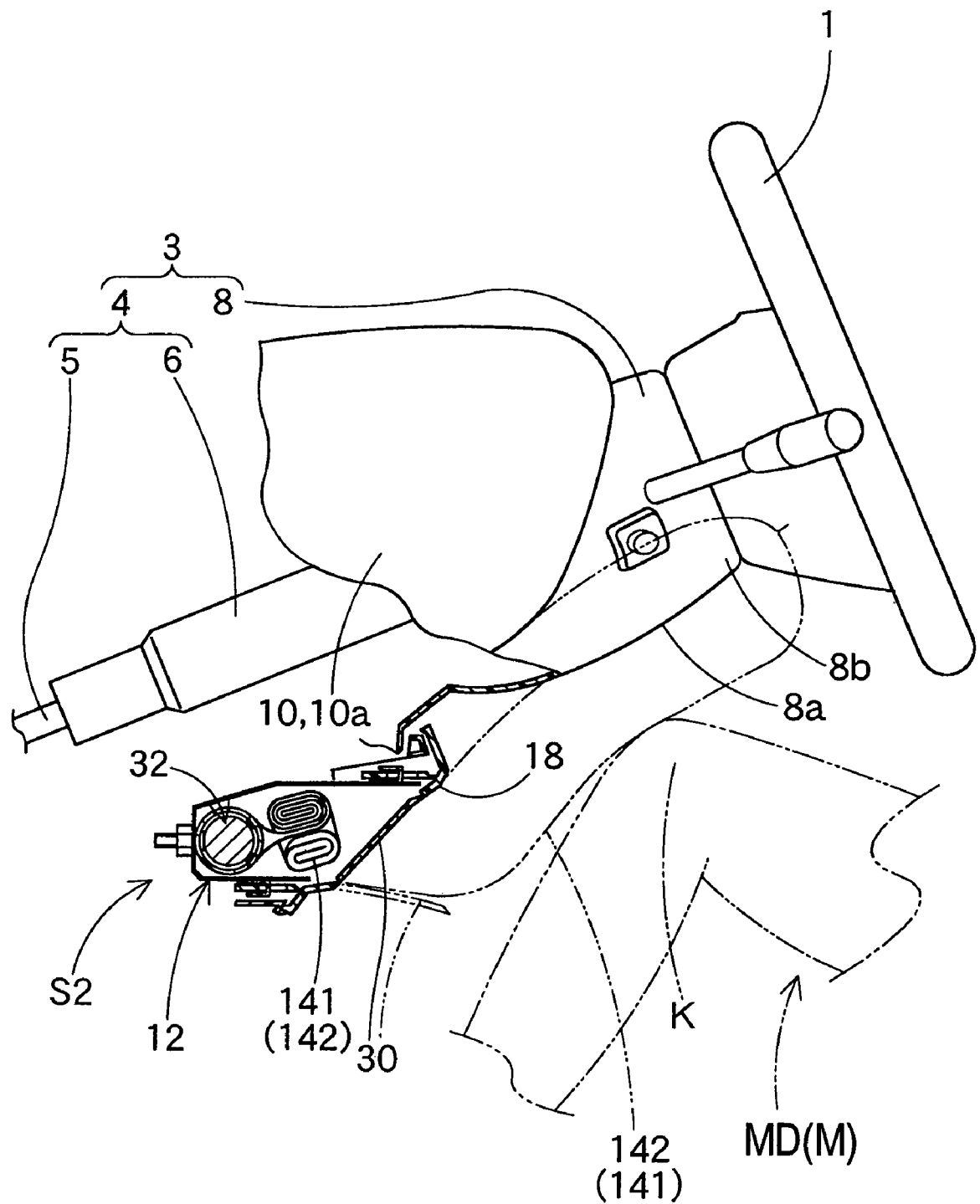
FIG. 9 is a schematic longitudinal section showing use of a knee protecting airbag device according to a second embodiment of the invention.

The second embodiment will be described by taking up the knee protecting airbag device S2 as an example. The knee protecting airbag device S2 is arranged like the aforementioned knee protecting airbag device S1 below the steering column 3 on the vehicular front side of the driver MD, as shown in FIG. 9. Here, the airbag device S2 has a construction similar to that of the aforementioned airbag device S1 except for the airbag 141. Therefore, the description of similar portions will be omitted, designating common members by common reference numerals.

Figure 11:
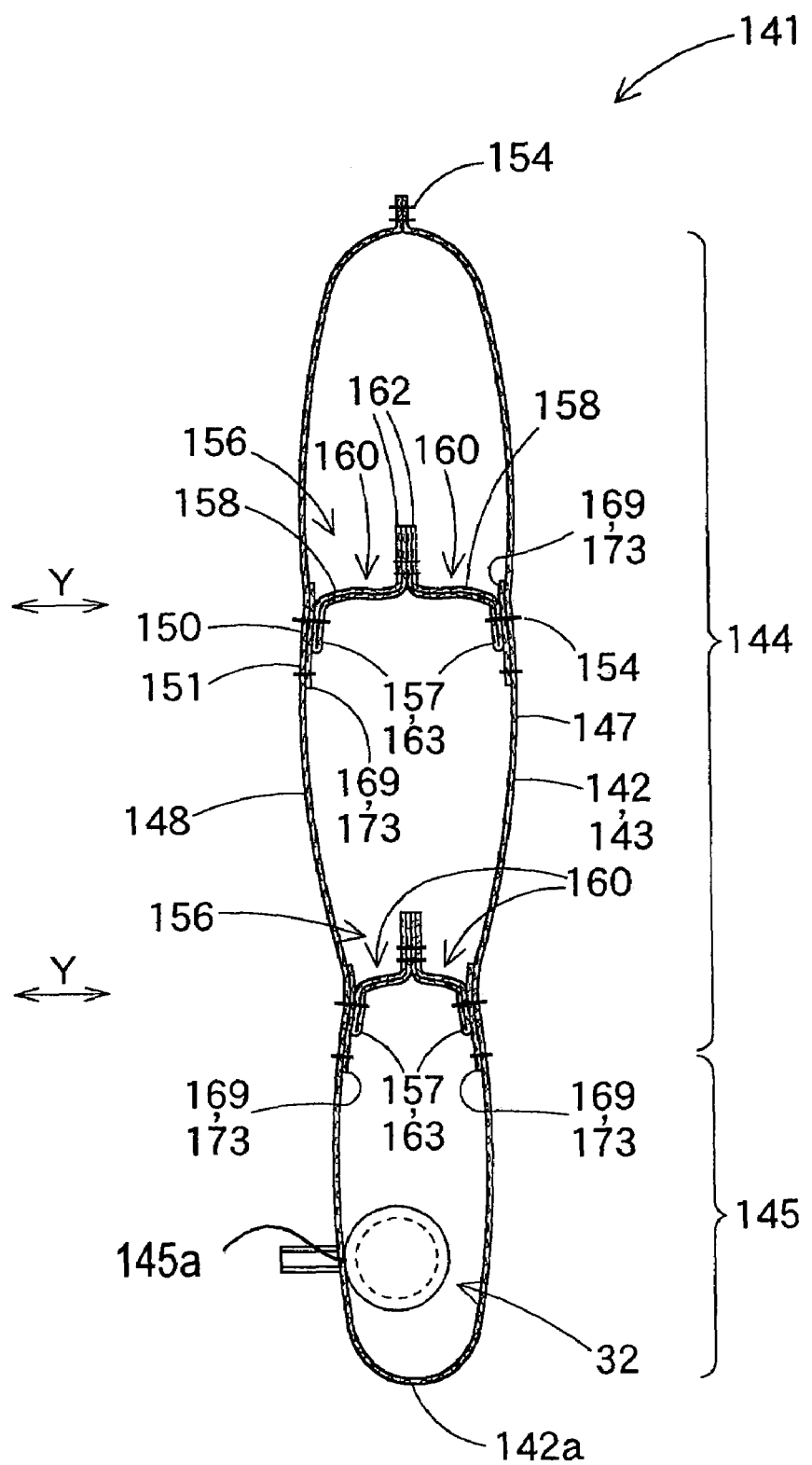
FIG. 11 is an enlarged schematic cross section of portion XI—XI of FIG. 10A.

As shown in FIGS. 10B and 11, the airbag 141 is provided with an airbag body 142 for constructing a bag-shaped outer peripheral wall, and two tethers 156 and 156 to be arranged in the airbag body 142.

The airbag body 142 is formed of a sheet of woven fabric (or an airbag body cloth member 143) made of flexible polyester or polyamide yarns or the like. Moreover, the airbag body 142 has a downward converging general folding fan shape, as shown in FIGS. 10B and 11, when it completes its inflation. The airbag body 142 is provided with a mounting portion 145 arranged on the side of its lower edge 142a, and an inflation portion 144 arranged above the mounting portion 145. The mounting portion 145 allows the inflator 32 to be inserted. The inflation portion 144 is set to have a transverse width size larger than that of the mounting portion 145.

The mounting portion 145 is the portion positioned upstream the inflating gas G. This mounting portion 145 is housed in the case 12, when the airbag 141 completes its expansion and inflation, and is held in the case 12 by making use of the inflator 32.

The inflation portion 144 is the portion positioned downstream of the inflating gas G. The inflation portion 144 expands and protrudes from the case opening 12e when the airbag 141 is inflated, thereby to protect the knees of the driver MD. When the airbag 141 completes its expansion, moreover, the inflation portion 144 covers the area from the vicinity of the opening 12e of the case 12 to the vicinity of the upper end 8b of the column cover lower face 8a.

This airbag 141 is formed by folding the airbag body cloth member 143, which is made of a sheet of woven fabric for forming the outer peripheral wall of the airbag body 142, at the portion which will be the lower edge 142a of the airbag body 142, and by sewing the peripheral edges of the folded confronting portions to each other with a sewing thread 154. Moreover, the airbag body 142 is provided with a passenger side wall portion 147 facing the driver MD and a vehicle side wall portion 148 facing the column cover 8, and these wall portions 147 and 148 individually have a general folding fan shape. Here, the sewing thread 154 is formed of multi-filaments or the like made of a synthetic resin such as polyester or polyamide.

In the lower side portion of the vehicle side wall portion 148 (the mounting portion 145), there are formed two insertion holes 145a and 145a and one insertion hole 145b. The insertion holes 145a and 145a are provided for inserting the individual bolts 34c of the inflator 32. The insertion hole 145b is provided for inserting the body 33 of the inflator 32.

Further, in the inflation portion 144 of the airbag body 142, there are arranged the band-shaped tethers 156 and 156, which extend in an upper row and lower row in the transverse direction. Each tether 156 is so arranged that the inflation portion 144 may keep the plate shape of the airbag body 142 without increasing the thickness of the vicinity of a central portion 144a when the airbag 141 completes its inflation. Therefore, the tethers 156 and 156 are arranged near the central portion 144a of the inflation portion 144.

Figure 12:
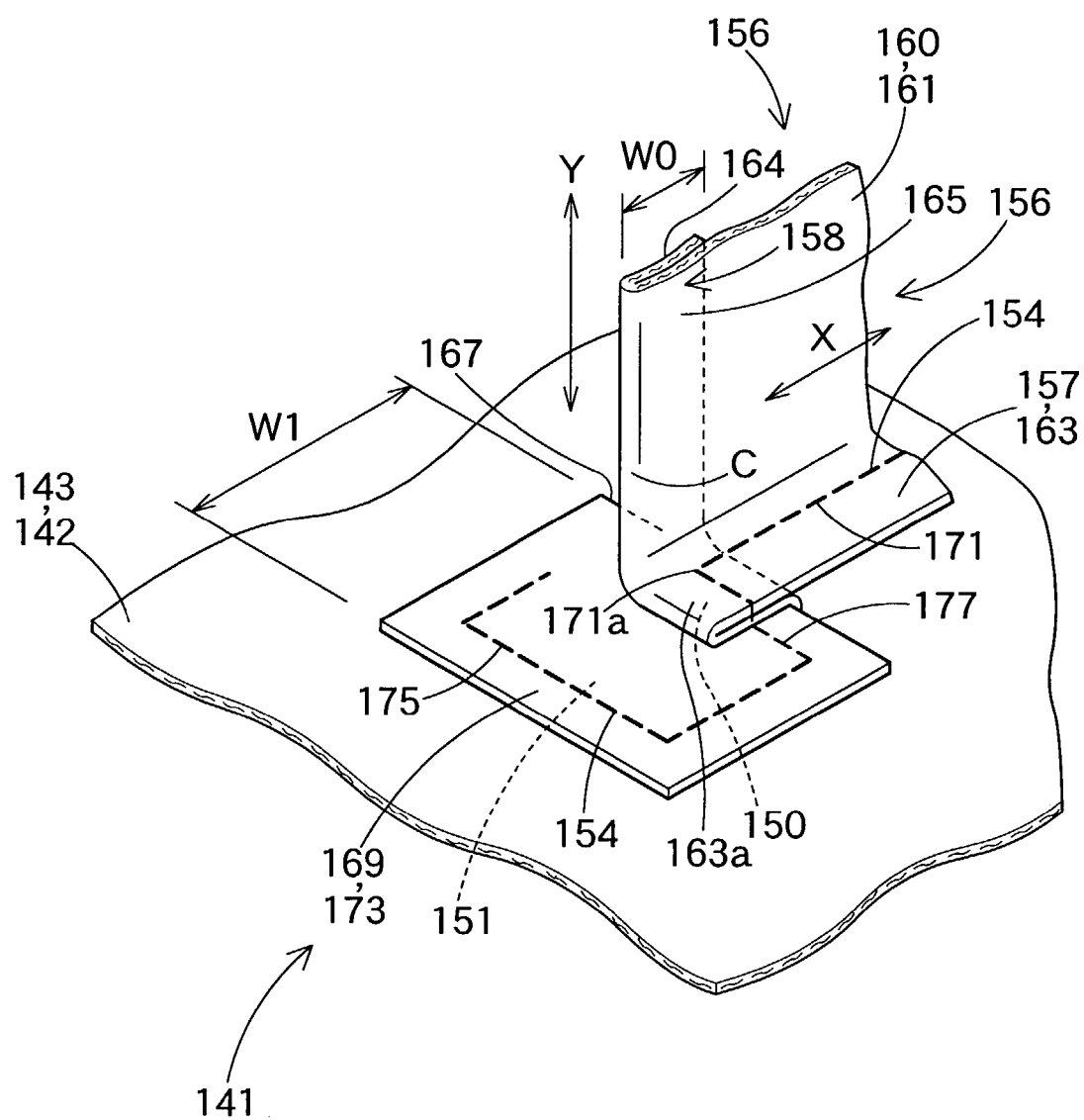
FIG. 12 is a partial, perspective view showing the joined state of a tether and a airbag body of the airbag of the second embodiment.

Each tether 156 is provided with joint ends 157 in the lengthwise direction Y, to be joined to the passenger side wall portion 147 and the vehicle side wall portion 148 of the airbag body 142 respectively. Thus, each tether 156 limits the spacing distance between the passenger side wall portion 147 and the vehicle side wall portion 148 in the airbag body 142 having completed its inflation to the length between the joint ends 157 and 157. Further, folded portions 158 are formed individually at the two transverse ends in the widthwise direction X perpendicular to the lengthwise direction Y (FIG. 12).

Each folded portion 158 is such a double-folded portion as is formed by folding the later-described tether cloth member 160 at its transverse (widthwise) edge portions 164. This folded portion 158 is also extended to the joint ends 157. In the case of the embodiment, moreover, each tether 156 is formed of the two tether cloth members 160, which are joined midway between the joint ends 157 and 157.

In the case of the embodiment, moreover, a reinforcing cloth 173 having a generally rectangular sheet shape is sandwiched on each transverse edge side in the widthwise direction X of each tether 156 between this tether 156 and the airbag body 142.

Figure 13:
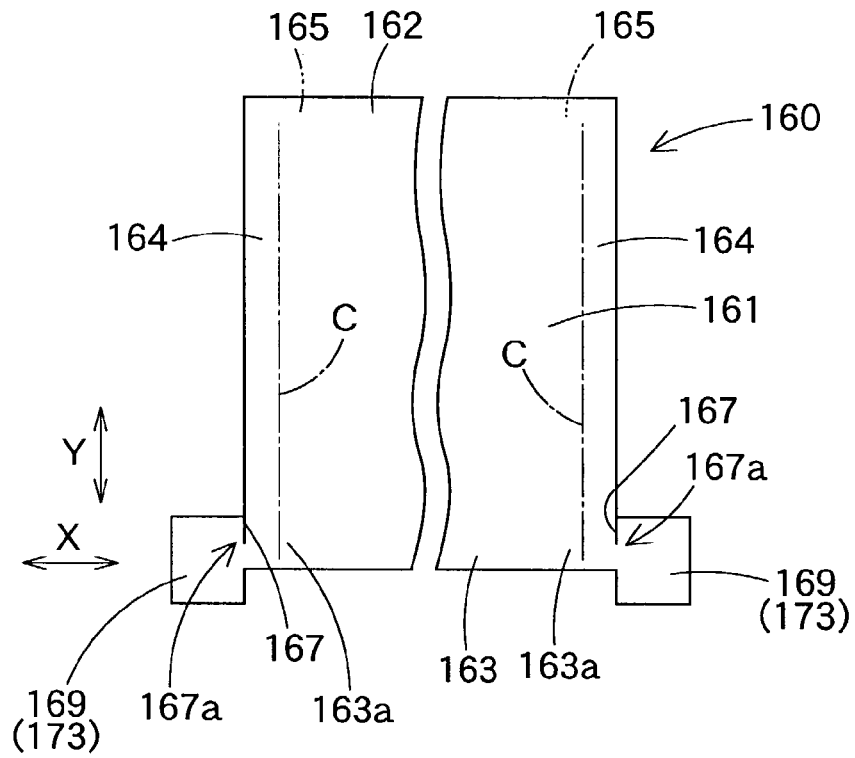
FIG. 13 is a partially omitted top plan view of a flattened tether cloth member of the second embodiment.

Each tether cloth member 160 is formed, like the airbag body 142, of a woven fabric of flexible polyester or polyamide. And, in the case of the embodiment, each tether cloth member 160 is provided, as shown in FIGS. 10 to 13, with a connection member portion 161, and two reinforcing portions 169 and 169 forming the reinforcing cloth 173. The connection member portion 161 is set to have a length size corresponding to the tether 156. Specifically, the connection member portion 161 is formed, when expanded flat, into a rectangular sheet shape extended in the widthwise direction X of the tether 156, as shown in FIG. 13. Further, the connection member portion 161 is folded on the sides of its two transverse (widthwise) edge portions to form creases C in the lengthwise direction Y so that the folded portions 158 are formed consisting of the edge portions 164 and overlap portions 165 lying over the edge portions 164.

Each tether cloth member 160 has end portions 162 on one side along the lengthwise direction Y, joined to each other to form the tether 156. Moreover, each tether cloth member 160 has end portions 163 at the other end along the lengthwise direction Y which are the joint ends 157 to be joined to the passenger side wall portion 147 or the vehicle side wall portion 148 respectively of the airbag body 142.

Each reinforcing portion 169 is formed in a generally rectangular sheet shape when the cloth member 160 is expanded flat. Moreover, each reinforcing portion 169 is formed to protrude from the end portion 164 of the connection member portion 161 along the transverse direction (the widthwise direction X). And, each reinforcing portion 169 is so formed to shift from the end portion 173 as to protrude from the connection member portion 161 along the lengthwise direction Y. At the boundary portion between each reinforcing portion 169 and the edge portion 164 of the connection member portion 161, there is formed a cut 167 along the crease C from the tether side end portion 162. Each reinforcing portion 169 is formed in a generally square shape with its side length (exterior size) W1 larger than the width W0 of the folded portion 158, about two or three times as large as the width size W0. The length of the cut 167 is set such that its leading end 167a in the state where the cloth member 160 is expanded flat is positioned near the extension of the later-described airbag body joint portion 171 formed of the sewing thread 154. Here, the airbag body joint portion 171 is made with the sewing thread 154. Specifically, this airbag body joint portion 171 is the joint portion of the joint end 157 of the tether 156 to the airbag body 142, that is, the joint portion in the airbag body side end portion 163 of the connection member portion 161 to the airbag body 142.

Figure 14:
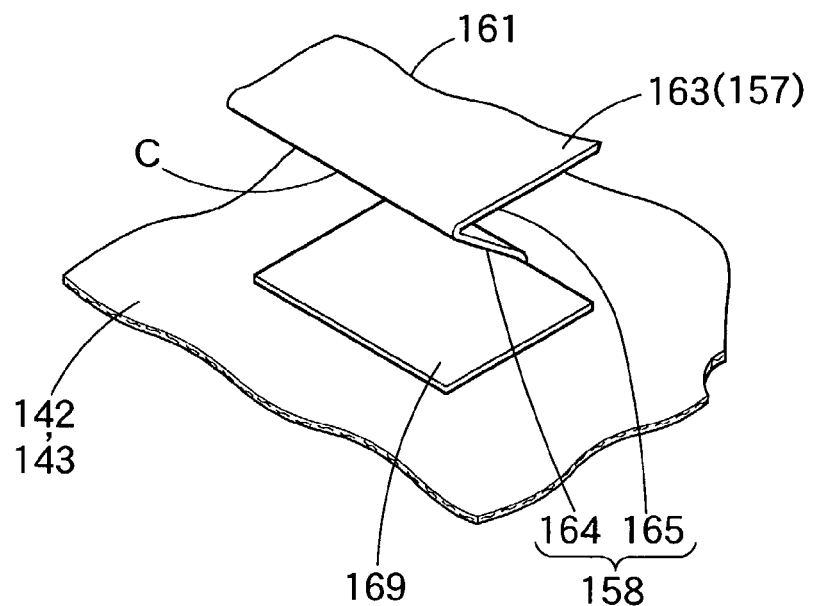
FIG. 14 is a perspective view for explaining the folded state of the tether cloth member of the second embodiment.

Each tether cloth member 160 is joined to the airbag body cloth member 143 in the following manner. At first, each cloth member 160 is folded from the flattened state laying the edge portion 164 under the overlap portion 165 so that there is formed the crease C at the left and right edge portions 164 of the connection member portion 161, thereby forming the folded portion 158. After this, each reinforcing portion 169 is so folded back (FIGS. 13 and 14) at the position of the cut 167 as to protrude from the folded portion 158 of the connection member portion 161. With each reinforcing portion 169 being applied to a predetermined portion of the airbag body cloth member 143 (a predetermined portion on the inner circumferential side of the airbag body 142), moreover, the airbag body side end portion 163 of the connection member portion 161 is put on a predetermined portion of the airbag body cloth member 143.

Figure 15:
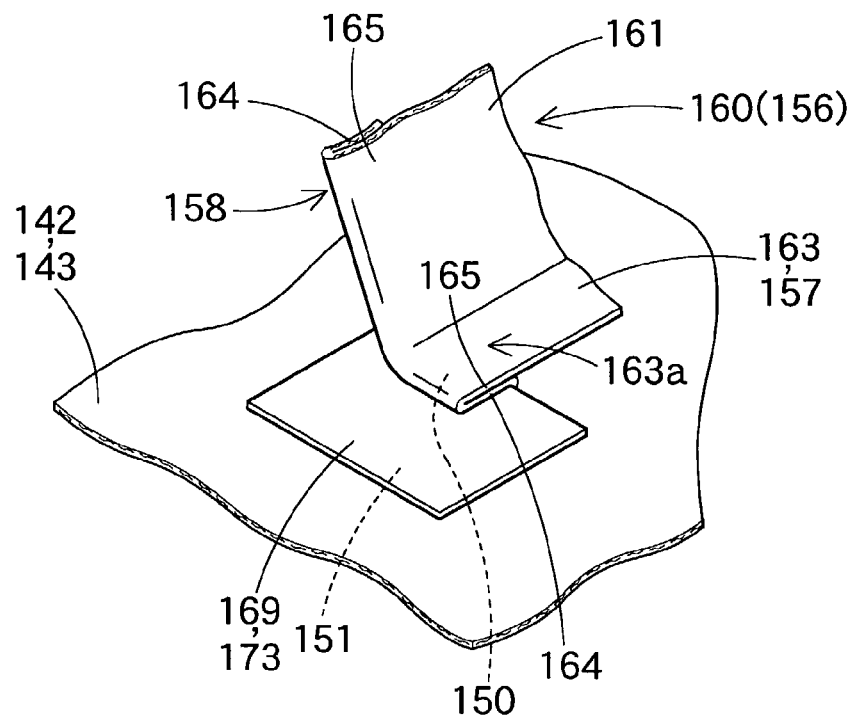
FIG. 15 is another perspective view for explaining the folded state of the tether cloth member of the second embodiment.
Figure 16:
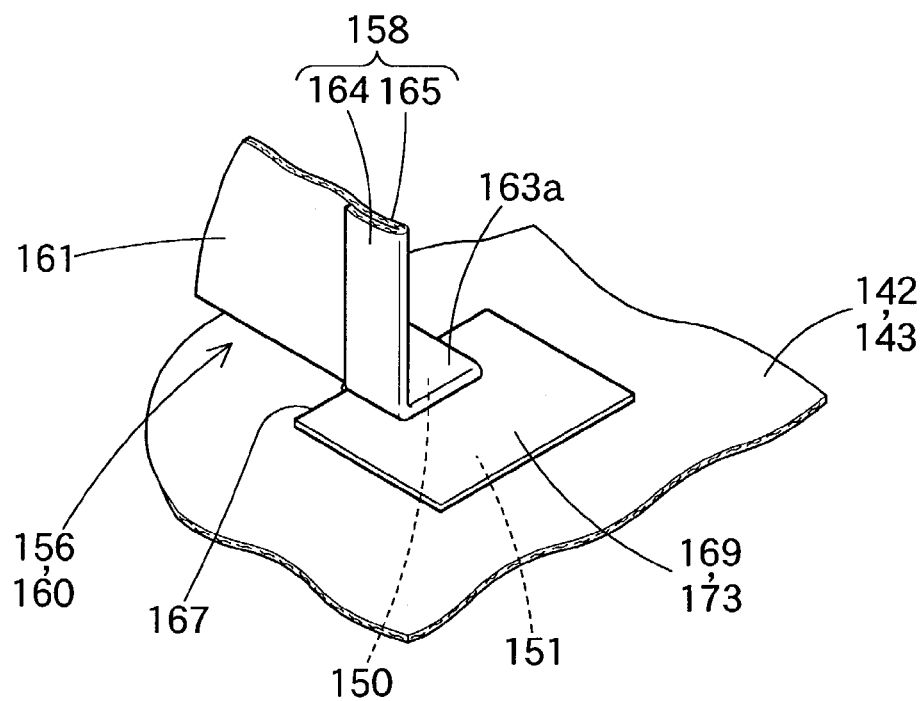
FIG. 16 is a perspective view showing the state of FIG. 15 from the opposite side.

At this time, the state shown in FIGS. 15 and 16 is brought about by raising the tether side end portion 162 side of the connection member portion 161 on the from the body cloth member 143. In this state, moreover, the edge portions 164 of the folded portions 158 do not contact the airbag body cloth member 143 at the two transverse edge portions 163a of the airbag body side end portion 163 of the connection member portion 161. In short, the reinforcing cloth 173 (or the reinforcing portion 169) is sandwiched between the edge portion 164 and the cloth member 143. Here, if the connection member portion 161 is further raised so that its tether facing end portion 162 is generally perpendicular to the airbag body facing end portion 163 (FIG. 16), the state of the tether cloth member 160 is substantially similar to that at the time when the airbag body 142 completes its inflation.

After the tether cloth member 160 having the folded portions 158 is arranged with respect to the airbag body cloth member 143, moreover, the airbag body side end portions 163 of the connection member portions 161 are sewn and joined to the body cloth member 143 by an industrial sewing machine or the like using the sewing thread 154. At this time, the joint portion 171 joining the body cloth member 143 with the sewing thread 154 is formed in the airbag body side end portion 163 in a linear shape along the transverse direction of the airbag 141. And, the folded portions 158 near the left and right edge side end portions 171a of the joint portion 171 are bonded to the body cloth member 143 through the reinforcing cloth 173.

At this sewing time, moreover, the outer peripheral edge of the reinforcing cloth 173 is sewn and joined to the body cloth member 143 by means of the sewing thread 154. The joined portion of the outer peripheral edge of the reinforcing cloth 173 to the body cloth member 143 forms a peripheral edge joint portion 175. This peripheral edge joint portion 175 is formed to half enclose the edge side end portion 171a of the airbag body joint portion 171 in the airbag body side end portion 163. In other words, the locus of the one half periphery of the peripheral edge joint portion 175 forms a general C-shape enclosing the end portion 171a on the sides other than that of the airbag body joint portion 171.

In the case of the embodiment, moreover, a connection portion 177 is provided so as not to cut the sewing thread 154, and thus the edge side end portion 171a of the airbag body joint portion 171 and the peripheral edge joint portion 175 are formed by a continuous sewing operation. Here in the case of the embodiment, the connection portion 177 is connected to the peripheral edge joint portion 175 by extending the sewing portion of the sewing thread 154 linearly in the direction from the end portion 171a apart from the tether side end portion 162 in the connection member portion 161.

After the connection member portion 161 and the reinforcing portion 169 of the tether cloth member 160 are joined to the airbag body cloth member 143, the airbag body cloth member 143 is then folded at the portion to be the lower edge 142a of the airbag body 142. After this, the tether side end portions 162 of the connection member portions 161 are sewn to each other with the sewing thread 154 to form the individual tethers 156. When the overlapping portions of the outer peripheral edges of the body cloth member 143 are then sewn to each other with the sewing thread 154, the airbag 141 is completed.

When sewing the outer peripheral edges of the body cloth member, a not-sewn portion 142b (FIG. 10B) is left like the aforementioned airbag 41. Moreover, the inflator 32 is inserted, and the not-sewn portion 142b of the airbag body 142 is sewn, similar to the aforementioned airbag 41.

Like the aforementioned airbag device S1, moreover, the airbag device S2 of the second embodiment can be mounted on the vehicle.

If the activation signals are inputted to the body 33 of the inflator 32 through the lead wire 39 after the airbag device S2 is mounted on the vehicle, the inflating gas G is discharged from the gas discharge port 33a of the inflator 32. After this, the inflating gas G flows into the inflation portion 144 of the airbag body 142 through the gas discharge ports 34b of the diffuser 34. Then, the airbag body 142 is inflated so as to break the not-shown wrapping film and push the door portion 30 of the airbag cover 18. Then, the airbag 141 breaks the breakaway portion 28 of the door portion 30 and opens the door portion 30 downward. As a result, the airbag body 142 (or the airbag 141) is expanded and inflated largely upward along the column cover lower face 8a, as indicated by double-dotted lines in FIG. 9.

In the airbag device S2 of the embodiment, moreover, the joint end 157 of the tether 156 in the widthwise direction X is joined to the airbag body 142 by using either of the overlapping portions 164 and 165 of the folded portions 158 as a reinforcing (or cushioning) cloth against stress. At the inflation time of the airbag 141, therefore, a strong impact is cushioned, even if applied to the folded edge portion 171a of the joint portion 171 at the tether joint end 157 joining the tether to the airbag body 142, thereby to suppress the breakage of the tether 156.

Especially, this folded portion 158 is formed by folding the edge of the tether 156 in the widthwise direction X. In other words, the folded portion 158 is not formed by folding the edge of the tether 156 in the lengthwise direction. When a tension acts on the tether 156, the stress concentration easily occurs especially at the edge side end portion 171a of the tether 156 in the widthwise direction X at the area of the joint portion 171 joining the tether 156 to the airbag body 142. In the embodiment, however, the folded portion 158 is formed by folding the side of the edge 164 of the tether 156 in the widthwise direction X. Therefore, the folded portion 158 can be arranged all over the length along the lengthwise direction Y of the tether 156. In other words, the stress concentration on the edge side end portion 171a of the joint portion 171 joining the tether 156 to the airbag body 142 can be dispersed in proportion to the layer number (sheet number) of the folded portions 164 and 165 of the folded portion 158. As a result, the tether 156 can prevent the breakage of the joint portion of the tether 156 to the airbag body 142 better than where the joint is made by folding the edge of the tether 156 in the lengthwise direction Y.

Further, this construction for preventing the breakage of the joint portion 171 of the tether 156 to the airbag body 142 can be easily made merely by folding the edge 164 of the tether 156 in the widthwise direction X.

In the airbag device S2 of the second embodiment, therefore, the breakage of the joint portion 171 of the tether 156 to the airbag body 142 can be prevented by that simple construction.

In the second embodiment, the folded portions 158 of the band-shaped tether 156 are provided at each of the two edges 164 of the tether 156 in the widthwise direction X. In case one edge 164 of the two edges 164 of the tether 156 in the widthwise direction X is subject to a higher tension than that of the other edge 164, the tether 156 may be bonded to the side of the airbag body 142 by forming the folded portion 158 only at one edge side 164.

In the airbag device S2 of the second embodiment, moreover, the folded portion 158 is doubly folded to have the edge portion 164 and the overlap portion 165. Naturally, another crease C may be formed to increase the overlap number of the cloth members 160 at the folded portion 158.

In the airbag device S2 of the second embodiment, moreover, the flexible reinforcing cloth 173 is sandwiched between the folded portion 158 of the tether 156 and the joint portion 150 of the airbag body 142 joined to the folded portion 158. Therefore, the reinforcing cloth 173 can act as a cushioning member for the airbag body 142 to prevent the breakage of the joint portion 150 joining the airbag body 142 to the tether 156.

In the airbag device S2 of the second embodiment, moreover, the reinforcing cloth 173 is integrated with the tether cloth member 160. As compared with the case in which the reinforcing cloth 173 is separate of the tether cloth member 160, therefore, it is easier to arrange or position the tether cloth member 160 and the reinforcing cloth 173 on the airbag body 142. If the reinforcing cloth 173 is made separate of the tether cloth member 160, more specifically, it may shift greatly or fall out from between the tether cloth member 160 and the airbag body 142. With the reinforcing cloth 173 integrated as the reinforcing portion 169 with the tether cloth member 160 as in the embodiment, however, the reinforcing cloth 173 can be prevented from shifting greatly or falling out from between the tether cloth member 160 and the airbag body 142.

If the aforementioned action and effect are not considered important, it is natural that the reinforcing portion 169 need not be provided on the tether cloth member 160, the reinforcing cloth 173 instead arranged separately of the tether cloth member 160.

In the airbag device S2 of the second embodiment, moreover, the reinforcing cloth 173 is joined to the airbag body 142 at its outer peripheral edge 175. Further, this peripheral edge joint portion 175 is arranged to enclose the edge side end portion 171a positioned at the folded portion 158 of the joint portion 171 joining the tether 156 to the airbag body 142.

With this construction, the peripheral edge joint portion 175 makes it difficult for the tension of the entirety of the airbag body 142 at the inflating time, especially the tension of the portion apart from the joint end 157 of the tether 156 in the airbag body 142, to propagate to the inside of that area 151 of the airbag body 142 which is enclosed by the reinforcing cloth 173. Therefore, the tension of the entirety of the airbag body 142 does not readily propagate to the edge side end portion 171a of the joint portion 171 of the tether 156 to the airbag body 142. As a result, the joint strength is improved between the folded portion 158 of the tether 156 at the edge side end portion 171a and the airbag body 142.

In the case of the airbag device S2 of the second embodiment, moreover, the joint portion 171 of the tether 156 to the airbag body 142, and the peripheral edge joint portion 175 of the reinforcing cloth 173 are formed by the sewing operation also forming the connection portion 177 to continue the sewing thread 154. In other words, these joint portions 171 and 175 can be formed by continuous operation without cutting the sewing thread 154. Therefore, the work to joint the airbag body side end portion 163 of the tether 156 or the reinforcing cloth 173 to the airbag body 142 can be simply done.

Here, these actions and effects can also be likewise achieved even in case the reinforcing cloth 173 is made separate of the tether cloth member 160.

Figure 17:
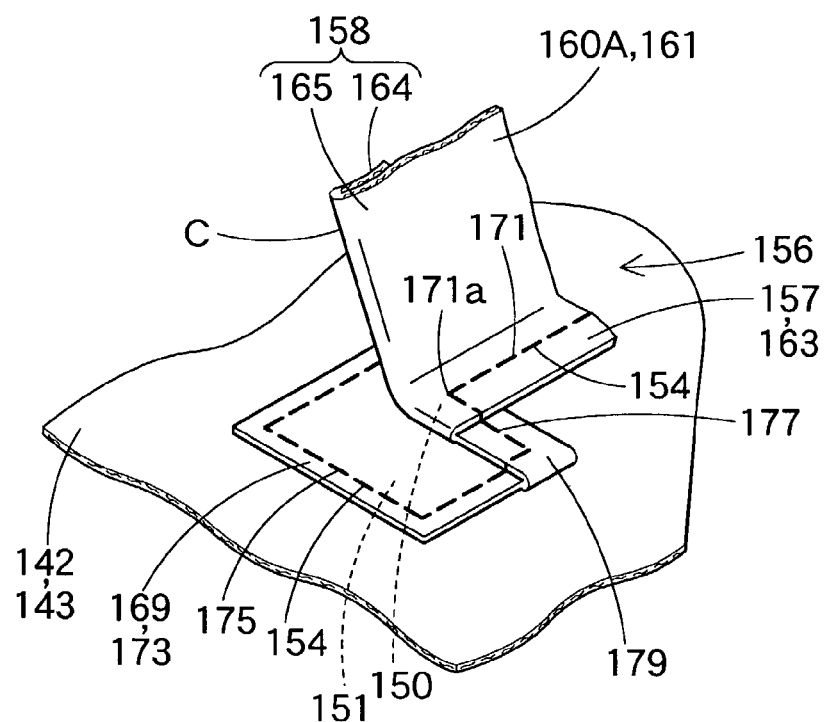
FIG. 17 is a partial, perspective view showing the joined state of the tether and the airbag body in the case where another tether cloth member is used.
Figure 18:
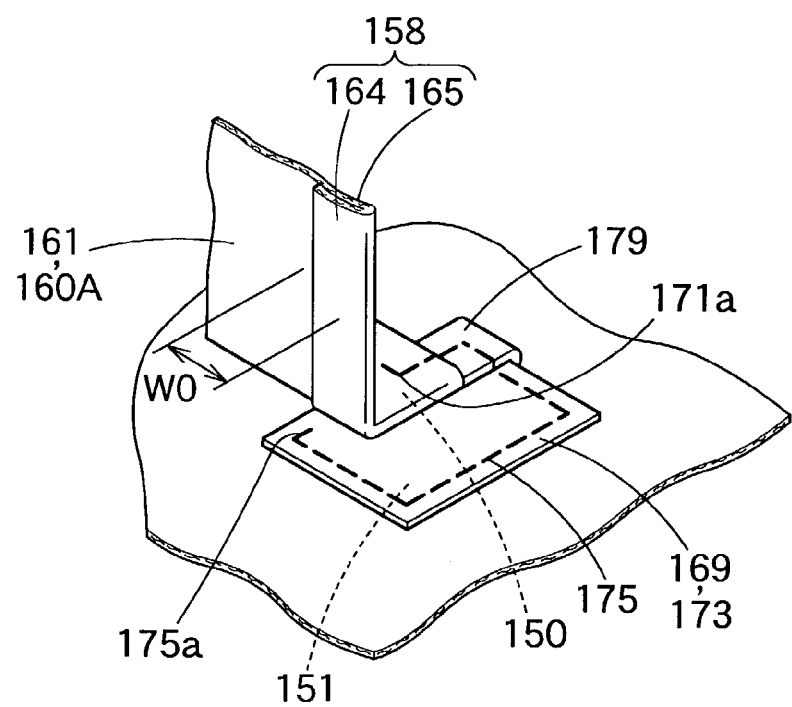
FIG. 18 is a perspective view showing the state of FIG. 17 from the opposite side.
Figure 19:
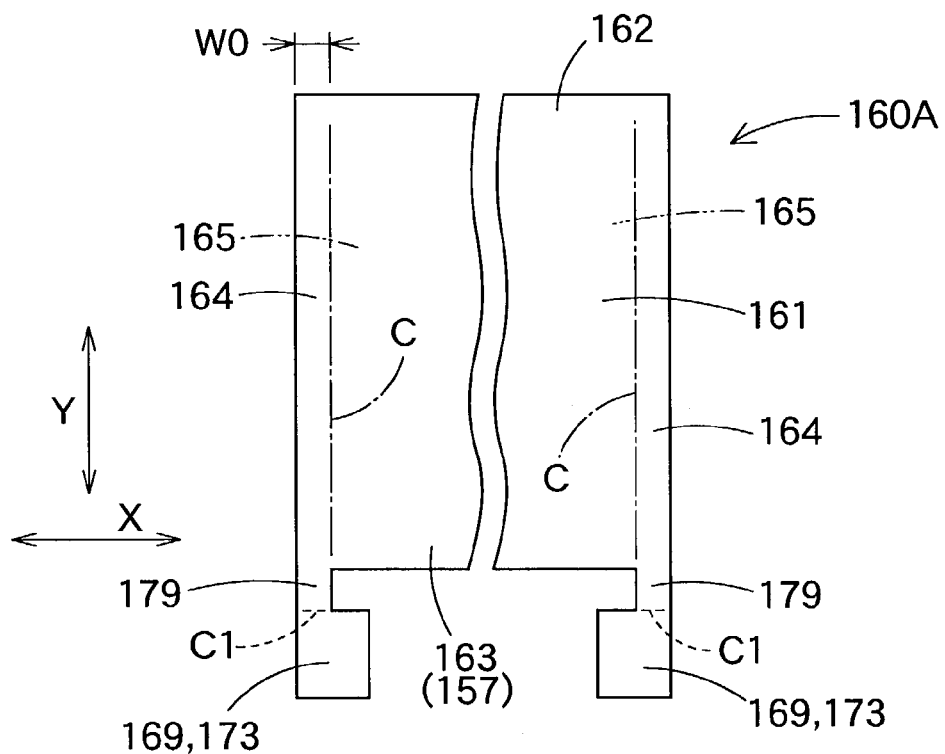
FIG. 19 is a partially cutaway top plan view of a flattened tether cloth member shown in FIGS. 17 and 18.

In case the reinforcing cloth is formed integrally with the tether cloth member, moreover, it may be constructed like the tether cloth member 160A of FIGS. 17 to 19. This tether cloth member 160A is formed of a flexible woven cloth as is the tether cloth member 160. In the flattened state, moreover, the tether cloth member 160A is provided with the connection member portion 161, and the two reinforcing portions 169 constructing the reinforcing cloths 173, as shown in FIG. 19.

The individual reinforcing portions 169 of the cloth member 160A are arranged on the left and right edge sides of the airbag body side end portion 163 of the connection member portion 161, like the cloth member 160. Unlike the cloth member 160, however, each reinforcing portion 169 of the cloth member 160A does not protrude from the airbag body side end portion 163 to the left and right sides but extends in the direction away from the tether side end portion 162. Moreover, the reinforcing portion 169 protrudes from the airbag body side end portion 163 through an extension portion 179 so that the edge side end portion 171a of the joint portion 171 joining the airbag body side end portion 163 of the tether to the airbag body 142 may be arranged near the center of the reinforcing portion 169. The extension portion 179 extends from the left or right edge 164 of the connection member portion 161 with a width size equal to the width size W0 of the folded portion 158 formed on the edge of the tether 156 in the widthwise direction X.

Figure 20:
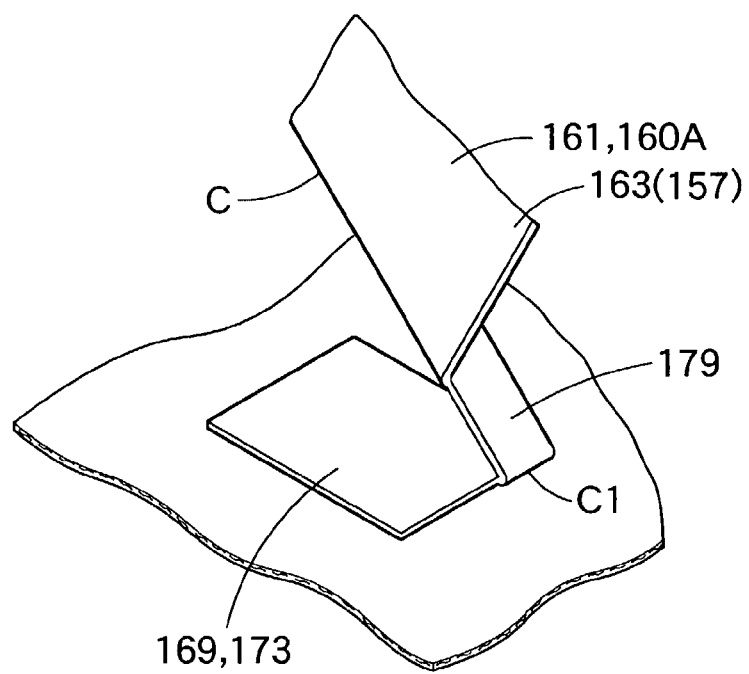
FIG. 20 is a perspective view for explaining the folded state of the tether cloth member shown in FIG. 19.

This cloth member 160A is joined to the airbag body cloth member 143 in the following manner. At first, each cloth member 160A is so folded from the flattened state as to form the crease C along the lengthwise direction Y of the tether 156 on the side of both left and side edge portions 164 of the connection member portion 161. At the portion of this crease C, moreover, the edge portion 164 is folded to lap under the overlap portion 165 to form each folded portion 158. At this time, the side of the extension portion 179 is also folded. After this, each reinforcing portion 169 is folded toward the edge portion 164 of the folded portion 158 by forming a crease C1 along the widthwise direction X of the tether 156 at the boundary of the reinforcing portion 169 of each extension portion 179 (FIG. 20).

With each reinforcing cloth 173 being applied to the predetermined position of the airbag body cloth member 143 (or the predetermined position on the inner circumference side of the airbag body 142), the airbag body side end portion 163 of the connection member portion 161 is applied to the predetermined position of the airbag body cloth member 143. After this, the joints 171, 175 and 177 are formed by the industrial sewing machine or the like using the sewing thread 154. In other words, the reinforcing portion 169 for forming the reinforcing cloth 173 is joined to the body cloth member 143 along with the airbag body side end portion 163 of the connection member portion 161.

Here in the peripheral edge joint portion 175, as shown in FIGS. 17 and 18, the peripheral edge joint portion 175 may be lengthened to enlarge the enclosure of the edge side end portion 171a of the joint portion 171. Moreover, the leading end portion 175a of the peripheral edge joint portion 175 may be bent toward the edge side end portion 171a so that stress concentration does not occur when the airbag body 142 completes its inflation.

Moreover, the second embodiment has been described on the case in which the reinforcing cloth 173 is provided to join the tether 156 to the airbag body 142. As shown in FIGS. 21 to 24, however, the reinforcing cloth 173 may be eliminated, and the folded portion 158 only may be formed at the edge of the tether 156, folded in the widthwise direction X and joined to the airbag body 142. In FIGS. 21 to 24, like reference numerals refer to identical or functionally similar elements in prior figures.

Figure 21:
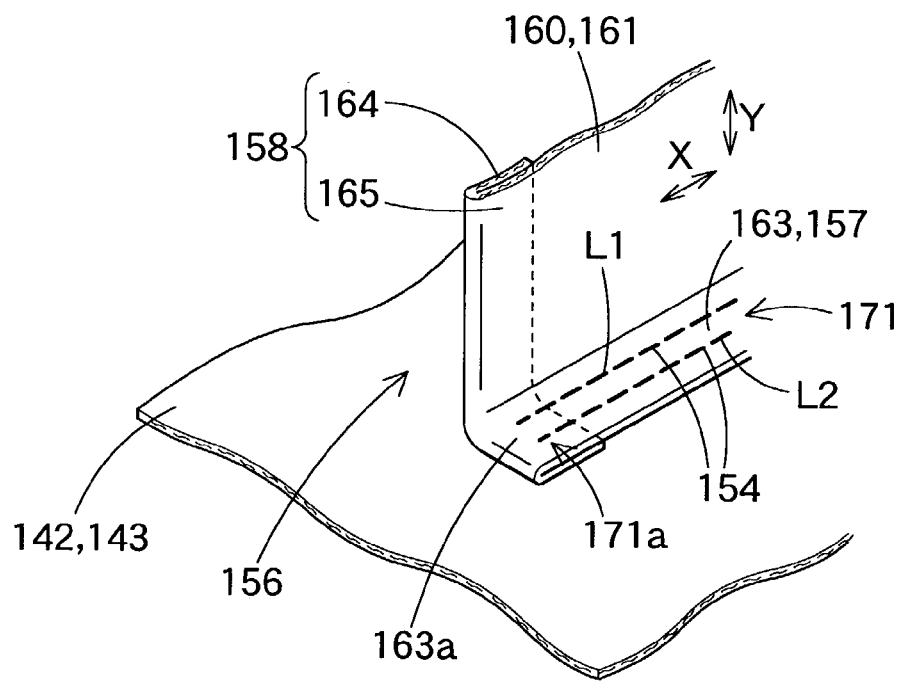
FIG. 21 is a partial, perspective view showing the joined state between another tether and the airbag body.

In case the joint portion 171 of the joint end 157 of the tether 156 joined to the airbag body 142 is to be formed by sewing with the sewing thread 154, moreover, it may be formed of a plurality of (or two in the shown example) linear sewing lines L1 and L2 along the widthwise direction X of the tether 156, as shown in FIG. 21.

Figure 22:
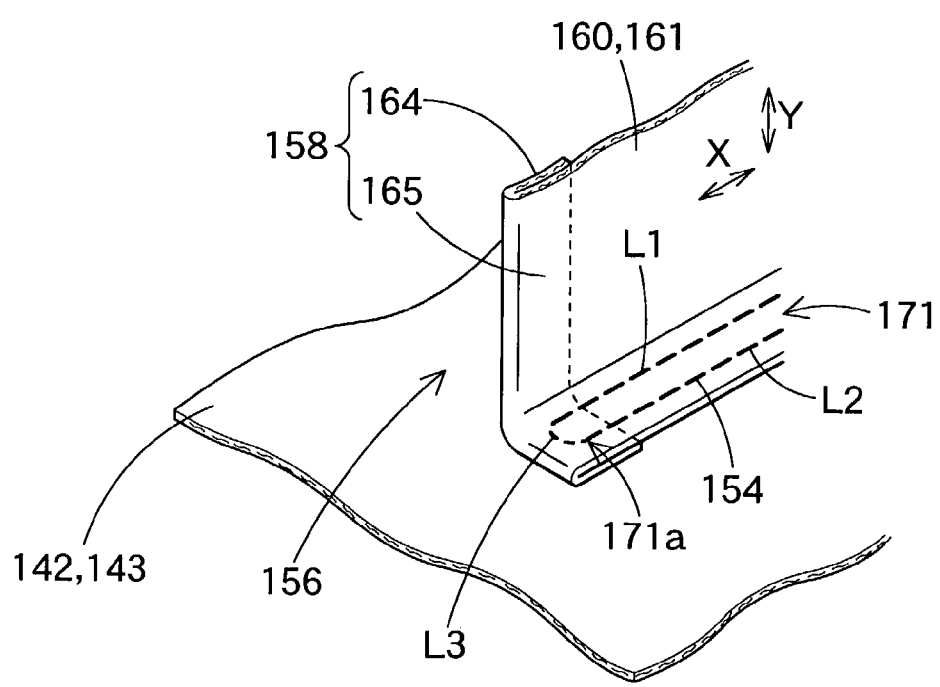
FIG. 22 is a partial, perspective view showing the joined state between still another tether and the airbag body.
Figure 23:
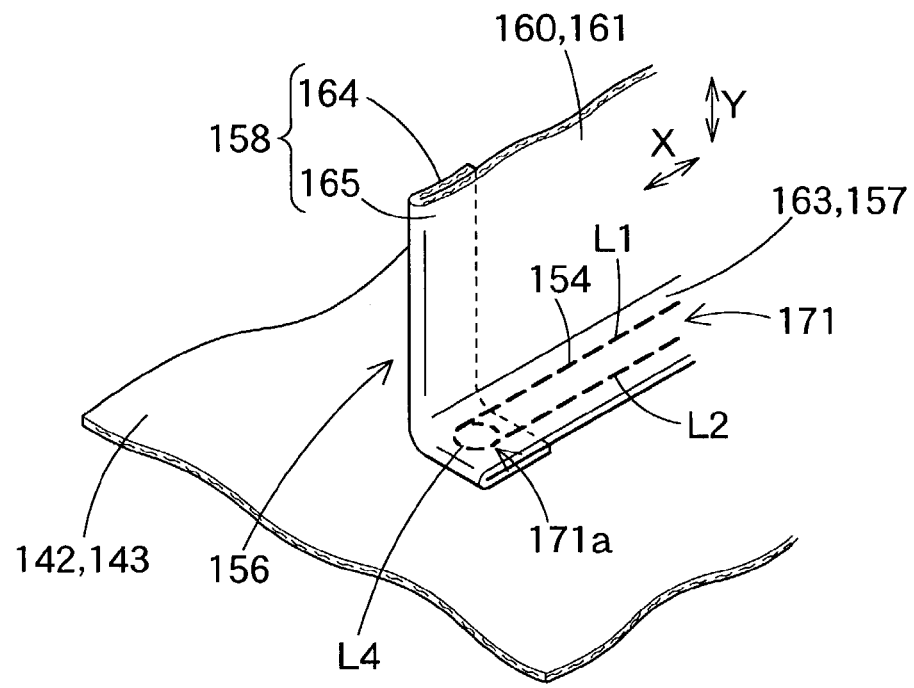
FIG. 23 is a partial, perspective view showing the joined state between still another tether and the airbag body.

In order to cope with the high stress concentration to act on the edge side end portion 171a of that joint portion 171, moreover, the sewing lines L1 and L2 of the edge side end portion 171a may be connected by an arc-like sewing line L3, as shown in FIG. 22. Alternatively, the sewing lines L1 and L2 may also be connected by an arc-like sewing line L4, as shown in FIG. 23.

Figure 24:
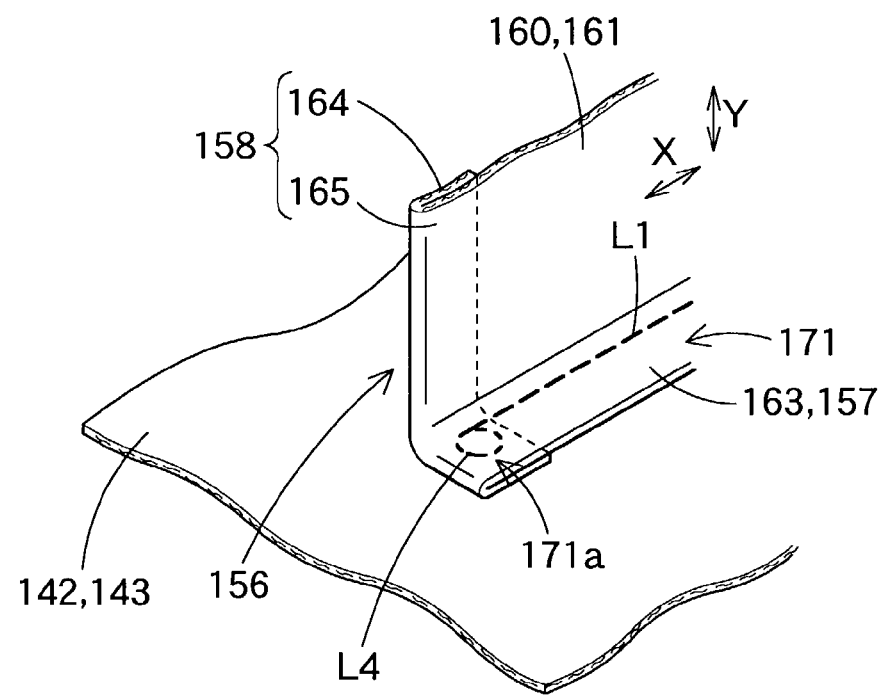
FIG. 24 is a partial, perspective view showing the joined state of still another tether and the airbag body.

Here in case the arc-like line L3 or L4 is formed at the end portion of such linear sewing lines, there need be only one linear sewing line L1, as shown in FIG. 24.

In the second embodiment, moreover, the sewing thread 154 is used as the joining means for jointing the tether 156 or the reinforcing cloth 173 to the airbag body 142. However, the joining means should not be limited to the sewing thread 154. For example, an adhesive or the like may be used as the joining means.

Moreover, the second embodiment has been described on the single band-shaped tether 156, which has the joints 157 arranged at the two lengthwise ends. However, the second embodiment may also be applied, for example, to a trifurcated tether having three joint ends to be joined to the airbag body or to a tether having still more joint ends, by forming the folded portion of the second embodiment at the joint portions of those tethers.

Moreover, the airbag device S2 of the second embodiment has been described by taking up the knee protecting airbag device S2 as an example. However, the airbag device, to which the airbag device S2 of the second embodiment can be applied, should not be limited to the knee protecting one. The airbag device S2 of the second embodiment can also be applied to a side collision airbag device, a passenger seat airbag device, a steering wheel airbag device and so on, if it is constructed of an airbag having tethers.

Moreover, the airbag device S2 of the second embodiment can also be applied not only to the airbag device which uses an airbag to joint tethers to the inner circumference side of an airbag body but also to an airbag device which uses an airbag having tethers joined to the outer circumference side of an airbag body, for example, so as to regulate the inflated shape of the airbag body.

What is claimed is:

1. An airbag device comprising: an airbag adapted to be expanded by admitting an inflating gas; and an inflator housed in said airbag for feeding the inflating gas to the inside of said airbag, wherein said airbag includes an airbag body forming a bag-shaped outer peripheral wall, and a reinforcing cloth for preventing a gas leakage from said airbag body, wherein said reinforcing cloth is joined at its peripheral edge to said outer peripheral wall in said airbag body on an upstream side of the inflating gas with respect to the inflator, and wherein said reinforcing cloth is joined to said outer peripheral wall at most of its edges but is not joined at an edge portion of said reinforcing cloth on a downstream side of the inflating gas with respect to the inflator.

2. An airbag device according to claim 1, wherein said airbag body is formed by joining the peripheral edges of a base cloth forming said outer peripheral wall to each other, and wherein said reinforcing cloth is joined at its peripheral edges together with the peripheral edge of said base cloth to said airbag body.

3. An airbag device according to claim 1, wherein said airbag body has a generally trapezoidal plate shape when completely inflated.

4. An airbag device according to claim 1,
wherein said reinforcing cloth is formed into a generally trapezoidal shape.

5. An airbag device comprising an airbag including: a flexible bag-shaped airbag body for forming an outer peripheral wall when it completes its inflation; and a tether made of a band-shaped cloth member having such a flexibility as to regulate the shape of said airbag body having completed its inflation,
wherein lengthwise end portions of said tether provide joint ends to be joined to said airbag body,
wherein said joint ends of said tether are each provided with a folded portion formed by folding the edges of said tether cloth member so that a crease along the lengthwise direction of said tether may be formed on at least one widthwise edge of said tether, and
wherein said folded portion of each joint end of said tether is joined to said airbag body so that said joint ends of said tether are on opposite sides of the airbag body in the widthwise direction thereof, and
wherein a width of said tether is smaller than a width of said airbag body when completely inflated, whereby an inflating gas during inflation passes between said tether and a periphery of said airbag.

6. An airbag device according to claim 5,
wherein a flexible reinforcing cloth is sandwiched between said folded portion of said tether and the portion of said airbag body joined to said folded portion.

7. An airbag device according to claim 6,
wherein said reinforcing cloth is connected to and integrated with said tether cloth member.

8. An airbag device according to claim 6,
wherein said reinforcing cloth is joined along its periphery to said airbag body, and
wherein a peripheral edge joint portion of the reinforcing cloth is arranged to enclose the end portion of the joint portion of said tether to said airbag body, which is arranged in said folded portion.

9. An airbag device according to claim 8,
wherein the portion of said tether joined to said airbag body and the peripheral edge joint portion of said reinforcing cloth are formed by one continuous sewing thread.

10. An airbag device according to claim 5,
wherein the portion of said tether to be joined to said airbag body is sewn with a sewing thread, and
wherein portions of said folded portion formed by said sewing thread near said joint ends are formed in an arc-like curve.

11. An airbag device according to claim 5, wherein said airbag body has a generally trapezoidal plate shape when completely inflated.

* * * * *